(12) United States Patent
Deladurantaye et al.

(10) Patent No.: US 7,974,319 B2
(45) Date of Patent: Jul. 5, 2011

(54) SPECTRALLY TAILORED PULSED FIBER LASER OSCILLATOR

(75) Inventors: Pascal Deladurantaye, St-Joseph De La Pointe-Lévy (CA); Louis Desbiens, St-Augustin-de-Desmaures (CA); Marco Michele Sisto, Québec (CA); Mathieu Drolet, St-Etienne de Lauzon (CA); Vincent Roy, Québec (CA); Yves Taillon, Saint-Augustin de Desmaures (CA)

(73) Assignee: Institut National D'Optique, Quebec, Quebec (CA)

( * ) Notice: Subject to any disclaimer, the term of this patent is extended or adjusted under 35 U.S.C. 154(b) by 312 days.

(21) Appl. No.: 12/408,215

(22) Filed: Mar. 20, 2009

(65) Prior Publication Data

US 2010/0128744 A1    May 27, 2010

Related U.S. Application Data

(60) Provisional application No. 61/116,873, filed on Nov. 21, 2008.

(51) Int. Cl.
*H01S 3/30* (2006.01)
(52) U.S. Cl. ..... 372/6; 372/26; 372/29.016; 372/29.023; 372/30
(58) Field of Classification Search ............... 372/6, 26, 372/29.016, 29.023
See application file for complete search history.

(56) References Cited

U.S. PATENT DOCUMENTS

| 4,560,246 | A | 12/1985 | Cotter |
| 5,200,964 | A | 4/1993 | Huber |
| 5,432,631 | A | 7/1995 | Mamyshev |
| 5,566,381 | A | 10/1996 | Korotky |
| 5,930,024 | A | 7/1999 | Atlas |
| 6,072,615 | A | 6/2000 | Mamyshev |
| 6,108,465 | A | 8/2000 | Iida et al. |
| 6,151,338 | A | 11/2000 | Grubb et al. |
| 6,552,301 | B2 | 4/2003 | Herman et al. |
| 6,587,623 | B1 | 7/2003 | Papen et al. |
| 6,778,565 | B2 | 8/2004 | Spuehler et al. |
| 6,813,448 | B1 | 11/2004 | Chiappetta |
| 6,856,640 | B2 | 2/2005 | Henrich et al. |
| 7,103,285 | B1 | 9/2006 | Okuno |
| 7,349,637 | B1 | 3/2008 | Frederiksen, Jr. et al. |

(Continued)

FOREIGN PATENT DOCUMENTS

| EP | 1 674 901 A1 | 6/2006 |
| WO | WO 2007/118333 A1 | 10/2007 |
| WO | WO 2008/032021 A2 | 3/2008 |
| WO | WO2008032021 * | 3/2008 |
| WO | WO 2008/086625 A1 | 7/2008 |

OTHER PUBLICATIONS

Jiang, Z. et al. "Optical arbitrary waveform processing of more than 100 spectral comb lines", Nature Photonics, vol. 1, Aug. 2007, pp. 463-467.

(Continued)

*Primary Examiner* — Dung T Nguyen
(74) *Attorney, Agent, or Firm* — Merchant & Gould P.C.

(57) ABSTRACT

High power optical pulses generating methods and laser oscillators are provided. A light generating module generates seed optical pulses having predetermined optical characteristics. A spectrum tailoring module is then used to tailor the spectral profile of the optical pulses. The spectral tailoring module includes a phase modulator which imposes a time-dependent phase variation on the optical pulses. The activation of the phase modulator is synchronized with the passage of the optical pulse therethough, thereby efficiently reducing the RF power necessary to operate the device.

30 Claims, 38 Drawing Sheets

U.S. PATENT DOCUMENTS

| | | |
|---|---|---|
| 7,428,253 B2 | 9/2008 | Murison et al. |
| 2002/0003641 A1* | 1/2002 | Hall et al. .................... 359/122 |
| 2006/0018349 A1 | 1/2006 | Kopf et al. |
| 2006/0159138 A1 | 7/2006 | Deladurantaye et al. |
| 2006/0245456 A1 | 11/2006 | Lasri et al. |
| 2007/0196048 A1 | 8/2007 | Galvanauskas et al. |
| 2009/0323741 A1 | 12/2009 | Deladurantaye et al. |
| 2010/0135347 A1 | 6/2010 | Deladurantaye et al. |

OTHER PUBLICATIONS

Golovchenko, E. et al. "Analysis of optical pulse train generation through filtering of an externally phase-modulated signal from a CW laser", Electronics Letters, vol. 31, No. 16, Aug. 1995, pp. 1364-1366.

Forrester et al. "Effects of heat transfer and energy absorption in the ablation of biological tissues by pulsetrainburst (.100 MHz) ultrafast laser processing", Photonics North, 2006, Proc. Of SPIE, vol. 6343, 63430J-I.

Jiang et al. "Optical Processing Based on Spectral Line-by-Line Pulse Shaping on a Phase-Modulated CW Laser", IEEE Journal of Quantum Elecronics, vol. 42, No. 7, Jul. 2006, pp. 657-666.

Mamyshev "Dual-wavelength source of high-repetition-rate, transform-limited optical pulses for soliton transmission", Optics Letters, vol. 19, No. 24, Dec. 15, 1994, pp. 2074-2076.

Nebel et al. "Generation of tailored picosecond-pulse-trains for micro-machining", Photonics West 2006, LASE Conference: Commercial and biomedical Applications of Ultrafast Lasers VI, Paper No. 6108-37 1/8.

Yamada et al. "Application of planar lightwave circuit platform to hybrid integrated optical WDM transmitter/receiver module", IEEE Electronics Letters Online, 19950941 (1995).

International Search Report for International Patent Application Serial No. PCT/CA2009/001692 mailed Feb. 8, 2010.

International Preliminary Report on Patentability for International Patent Application Serial No. PCT/CA2009/000365 dated Nov. 15, 2010.

Agrawal, Govind P. *Nonlinear Fiber Optics*. Academic Press, San Diego, 2001. Chapter 9, pp. 370-403.

Boyd, R.W. *Nonlinear Optics*. $3^{rd}$ Edition, Academic Press, 2008, Section 9.3.3., pp. 447-448.

Boggio et al. "8 dB increase of the SBS threshold in an optical fiber by applying a stair ramp strain distribution." *Conference on Lasers and electro-Optics/International Quantum Electronics Conference and Photonic Applications Systems Technologies*. Technical Digest (CD) Optical Society of America, 2004, paper CThT30.

Cotter et al. "Stimulated Brillouin Scattering in Monomode Optical Fiber." *Journal of Optical Communications*, vol. 4, Issue 1, 1983, pp. 10-19.

Hansryd et al. "Increase of the SBS Threshold ina Short Highly Nonlinear Fiber by Applying a Temperature Distribution." *Journal of Lightwave Technology*. vol. 19, No. 11, Nov. 2001, pp. 1691-1697.

\* cited by examiner

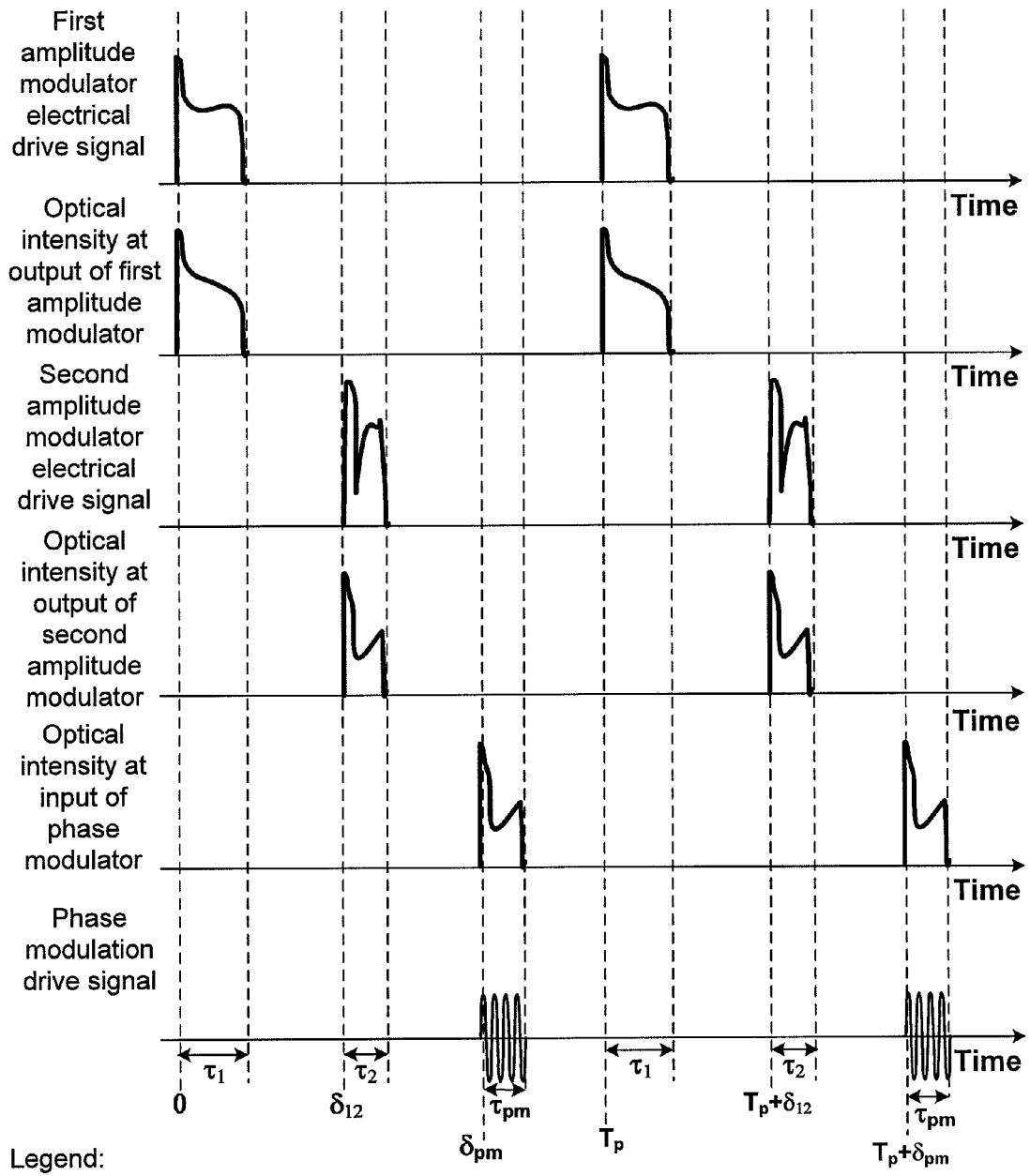

Fig. 8B

Legend:

$\tau_1$: First modulator opening time
$\tau_2$: Second modulator opening time
$\tau_{pm}$: Phase modulator activation duration ($\tau_{pm} \geq \tau_2$)
$\delta_{12}$: Delay between first and second amplitude modulator drive signals
$\delta_{pm}$: Delay between first amplitude modulator drive signal and arrival of the optical pulse at the phase modulator
$T_p$: Pulse repetition period (equal to 1/Pulse repetition rate)

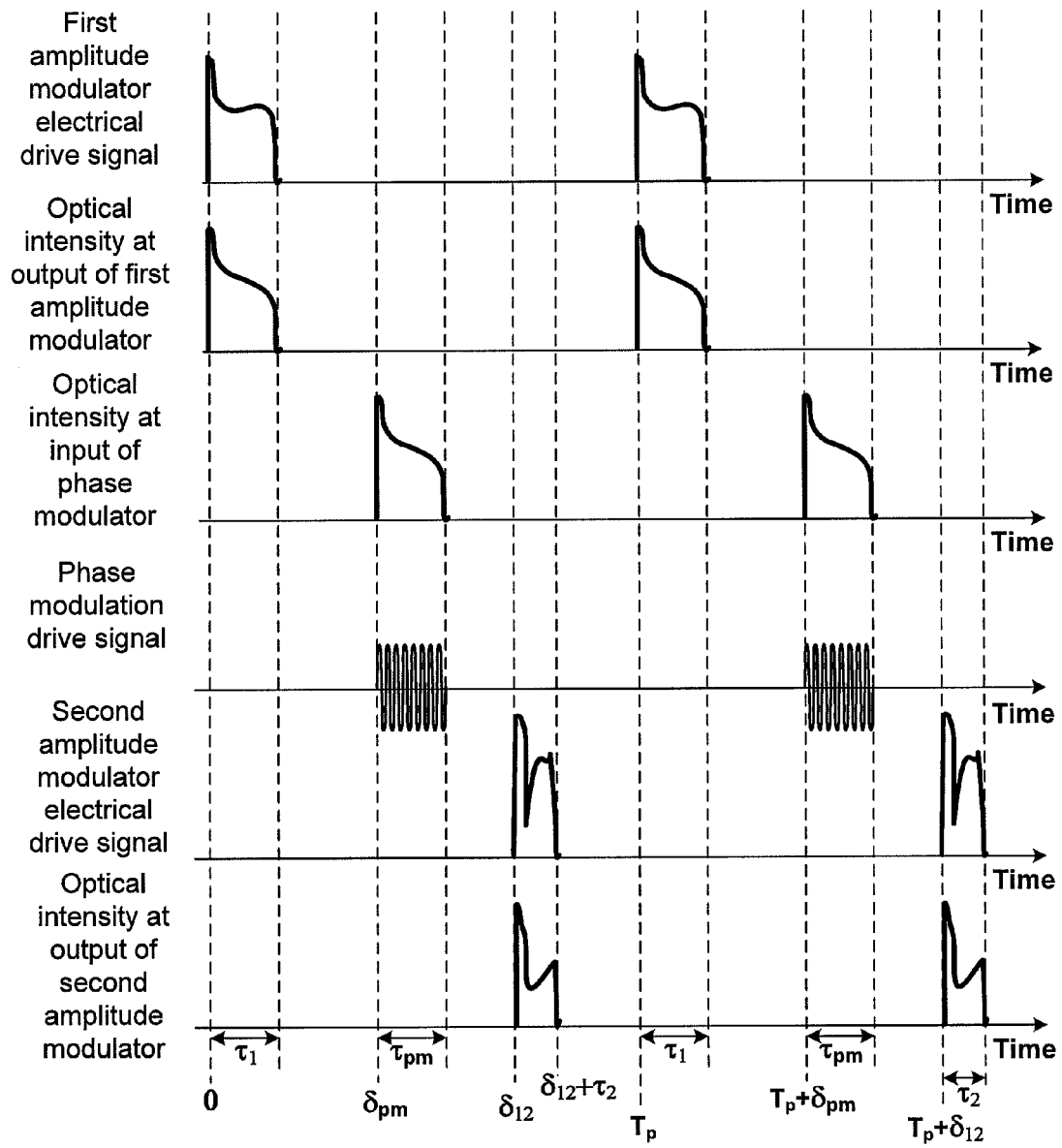

Fig. 9B

Legend:

$\tau_1$: First modulator opening time
$\tau_2$: Second modulator opening time
$\tau_{pm}$: Phase modulator activation duration ($\tau_{pm} \geq \tau_1$)
$\delta_{12}$: Delay between first and second amplitude modulator drive signals
$\delta_{pm}$: Delay between first amplitude modulator drive signal and arrival of the optical pulse at the phase modulator
$T_p$: Pulse repetition period (equal to 1/Pulse repetition rate)

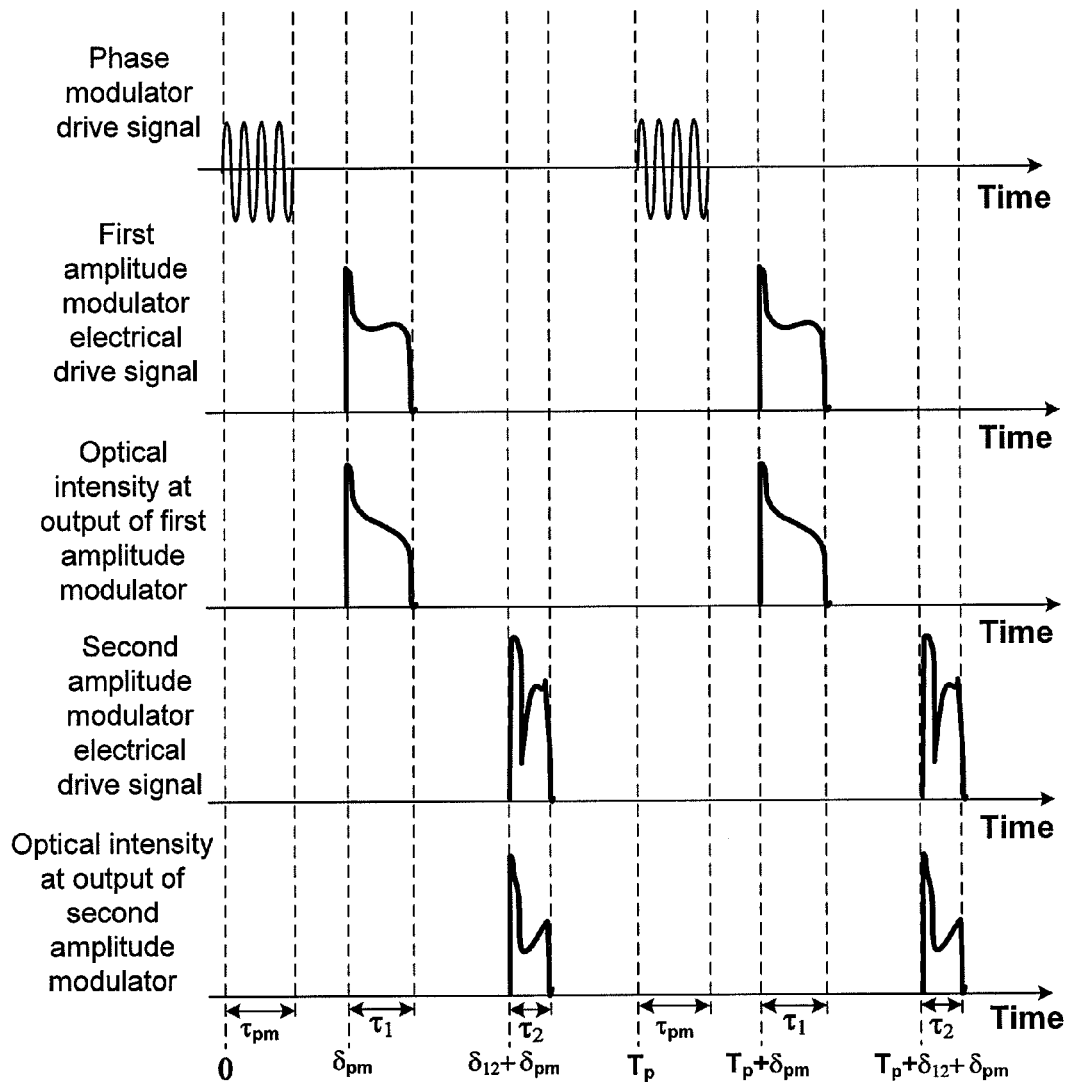

Fig. 10B

Legend:

$\tau_{pm}$: Phase modulator activation duration
$\tau_1$: First modulator opening time ($\tau_1 \leq \tau_{pm}$)
$\tau_2$: Second modulator opening time
$\delta_{12}$: Delay between first and second amplitude modulator drive signals
$\delta_{pm}$: Delay between phase modulator and first amplitude modulator drive signals
$T_p$: Pulse repetition period (equal to 1/Pulse repetition rate)

Legend:

τ: optical pulse duration

δ: Delay between the pulse generator signal and the first arrival of the optical pulse at the phase modulator $δ_2$: Round-trip time delay of the optical pulse in the recirculation loop, with respect to the phase modulator

SPECTRALLY TAILORED PULSED FIBER LASER OSCILLATOR

This application claims benefit of 61/116,873, filed Nov. 21, 2008 in the United States of America and which application is incorporated herein by reference. To the extent appropriate, a claim of priority is made to the above disclosed application.

FIELD OF THE INVENTION

The present invention relates to the field of laser devices and more particularly concerns methods for tailoring the spectrum of a narrow linewidth pulsed fiber laser.

BACKGROUND

High power pulsed fiber laser are currently in demand for a number of applications and uses. For example, numerous material processing applications such as memory repair, milling, micro-fabrication, drilling, etc. require pulsed laser systems which provide, among others, the four following characteristics all at the same time and with a great stability over the different conditions of operation and over time:

High pulse energy (50 µJ or higher) with excellent pulse amplitude stability, for processing material at the laser operating wavelength or for efficient frequency conversion;

Excellent beam quality ($M^2<1.1$, astigmatism <10%, beam roundness >95%) with robust single mode operation, for superior processing quality, high throughput processes and efficient frequency conversion;

Narrow linewidth ($\Delta\lambda<0.5$ nm), for small spot sizes and efficient frequency conversion; and Great flexibility in terms of control of the pulse temporal profile, like pulse to pulse control over the temporal profile at high (>100 kHz) repetition rates.

In other applications such as remote sensing of different chemical species, the source must additionally provide some level of flexibility over the pulse spectrum.

Scaling the output power without deteriorating other essential characteristics of the laser, such as beam quality or spectral purity, is a main challenge for high power pulsed fiber laser designers. When increasing the pulse peak power, the onset of different nonlinear effects such as Stimulated Brillouin Scattering (SBS), Self-Phase Modulation (SPM), or Stimulated Raman Scattering (SRS) can seriously limit the maximum output power ultimately achievable in a given spectral bandwidth by a pulsed fiber laser system. For narrow linewidth lasers, SBS is generally the first nonlinear effect that manifests when the pulse peak power exceeds a certain level, the so-called SBS threshold. The impacts of SBS are mainly a degradation of the pulse amplitude stability, the appearance of counter-propagating satellite pulses, a roll-off in the laser output power vs pump power curve or even permanent damages to the laser's optical components.

The process of SBS can be described classically as a parametric interaction among the pump wave (which is formed by the optical pulses), the Stokes wave (partially reflected optical pulses) and an acoustic wave. The pump wave generates acoustic waves through electrostriction which in turn causes a periodic modulation of the refractive index in the fiber. This periodic index modulation creates a grating that partially scatters the pump wave through Bragg diffraction, causing the detrimental impacts just described. SBS has been studied extensively since its discovery in 1964. For a general presentation of the SBS theory in the context of optical fibers see for example Govind P. Agrawal, "Nonlinear fiber optics", Academic Press, San Diego, 2001, chapter 9.

Different SBS mitigation paths exist, such as increasing the fiber mode field diameter to reduce the fluence in the core, thereby increasing the SBS threshold. Such fibers are known to those skilled in the art as Large Mode Area (LMA) fibers. However, this solution has practical limits to the achievable beam quality robustness. Experience has proven that even with sophisticated LMA fiber designs with special index profiles, severe fiber packaging constraints must be carefully addressed to maintain good beam characteristics, even for modest fiber core diameters in the range of 20-30 µm. When such fibers are used for narrow linewidth applications, with pulse durations ranging from 10 ns to 100 ns, the maximum achievable pulse energy seldom exceeds 10 to 15 µJ since it is limited by the onset of SBS even for short lengths of fiber.

Other SBS mitigation paths rely on broadening the SBS gain bandwidth by applying a strain distribution [see J. M. Chavez Boggio, J. D. Marconi and H. L. Fragnito, "8 *dB increase of the SBS threshold in an optical fiber by applying a stair ramp strain distribution*", CLEO04 conf. Proceedings, paper CThT30] or a temperature distribution [see J. Hansryd, F. Dross, M. Westlund, "*Increase of the SBS Threshold in a Short Highly Nonlinear Fiber by Applying a Temperature Distribution*", J. Lightwave Technol., vol. 19, pp. 1691-1697, November 2001] along the fiber. The strain distribution solution is thought to be more adapted to passive single mode fibers in telecom applications but is not considered practical for high power fiber applications, since applying a controlled strain distribution on a LMA fiber while keeping stable beam characteristics is not really attractive from a practical point of view, due to the quite high modal sensitivity to mechanical constraints (torsion, curvatures, etc.) usually displayed by LMA fibers. In order to use the temperature distribution approach, relatively high temperature gradients (>100° C.) are needed to obtain a valuable SBS threshold increase, which can reduce unacceptably the lifetime and reliability of an LMA fiber incorporating a high index polymer cladding to guide the pump light.

Other known SBS mitigation schemes include designing a fiber with tailored acoustic properties. For example, PAPEN et al. [U.S. Pat. No. 6,587,623] disclose the idea of including an acoustic guiding layer surrounding the fiber core so as to spread the acoustic energy over a large number of acoustic modes, thereby broadening the Brillouin gain spectrum. In another approach HASEGAWA [European patent application no. EP 1 674 901] discloses an acoustic guiding layer specially designed to minimize the overlap between the acoustic modes and the fundamental optical mode. Although attractive for optical fibers having relatively small mode field diameters, the potential of those approaches is again thought to be limited for LMA fibers since the impact of adding the acoustic guiding layer on the fiber optical guiding properties represents a major additional fiber design constraint to obtaining excellent beam characteristics with great robustness. The same argument also applies in general to all approaches implying modifying the fiber structure or its chemistry.

Yet another avenue for addressing SBS related issues is to amplify signals having linewidths significantly broader than the typical SBS gain bandwidth in optical fibers (10-100 MHz). In order to design pulsed fiber laser system producing high peak power pulses having durations in the range of 1 ns to 100 ns, the spectral bandwidth must be broad enough to promote high SBS thresholds, while being narrow enough to enable efficient frequency conversion and avoid problems inherent to less coherent sources. The ideal linewidth is usually in the range of a few GHz to some tens of GHz, a range for which the pulsed laser is considered to be a "narrow linewidth" laser in the context of the different applications mentioned above.

Experience shows that providing a stable pulsed fiber laser with such a spectrum can prove to be difficult. Broader seed sources such as multi-longitudinal mode laser diodes generally exhibits more amplitude noise than narrower sources, due to mode competition, which is detrimental for the pulse amplitude stability. To minimize this amplitude noise the number of longitudinal modes in the seed source must be limited, in which case the spectral width must be of the order of a few hundreds of MHz for acceptable pulse amplitude stability levels to be maintained, clearly well below the ideal range for overcoming SBS.

Alternatively, low-coherence seed sources based on spectrally filtered fluorescence may be used, such as disclosed in international patent application no. WO 2008/086625 (MURISON et al.). Since they do not involve a laser cavity, the fluorescence-based seed sources are not plagued by longitudinal mode beating noise. However, they are relatively inefficient since only a very small fraction of the produced fluorescence (about 0.1% for fiber gain media) is initially selected by the filter element. For polarized sources, the efficiency is even lower as half of the fluorescence power is lost after polarization filtering. Additional optical amplifier stages are therefore often required to boost the output power to usable levels, which increases the overall complexity, component count and cost of the device.

In addition to the practical difficulties listed above, broad linewidth sources also suffer from a susceptibility to nonlinear effects other than SBS, especially SPM, which may quickly broaden the spectrum beyond the maximum acceptable width as the peak power increases in the fiber amplifier. This effect is greater for broad linewidth than for narrow linewidth sources, due mainly to the low coherence and to the important phase noise of the former. This transfers the optical power from the spectral region of interest into large spectral "wings", thereby reducing the spectral power density of the source. Numerous papers about fiber lasers and amplifiers announcing record peak power levels have been published throughout the years, but often the spectral power density was not discussed or presented, mainly because in reality SPM broadens the spectrum to a point where only a modest fraction of the amplified signal lies in the spectral band of interest. Such a broadening is evidently incompatible with efficient frequency conversion and can create other frequency conversion issues such as poor pulse shape control in the harmonics because of the important frequency chirp developing along the pulse when SPM takes place. Therefore, although SBS is the first nonlinear effect to overcome when scaling the output power of a narrow linewidth fiber laser, it is also very important that the chosen SBS mitigation path does not negatively impact on the mitigation of SPM, which is the next power scaling obstacle.

In another spectral broadening approach, MURISON et al. disclose a seed source based on a frequency chirp induced by amplitude modulation [see International patent application published under no. WO 2008/086625]. In some embodiments, the chirp is obtained using an amplitude modulator having a non-zero chirp parameter. In other embodiments, the injection current of a semiconductor laser diode is modulated in order to generate pulses with a frequency chirp along the pulse. Typically pulses having triangular shapes are generated and an amplitude modulator located downstream the laser diode further gates the pulse in the time domain. The SBS threshold is increased as a result of the spectral broadening corresponding to the frequency chirping. However, one important drawback of the amplitude modulation approach for pulsed lasers is that it induces a strong coupling between the pulse characteristics (amplitude, shape, etc.) and the efficiency of the SBS suppression. The SBS suppression therefore imposes variable limits or constraints on the pulse shape depending upon the conditions of operation (pulse repetition rate, output power, etc.), limiting the flexibility of the device. Another drawback is that the chirp creates an additional pulse shape distortion factor for applications using the laser harmonic wavelengths. As the frequency varies more or less linearly along the pulse, the frequency conversion efficiency will also vary along the pulse, leading to pulse shape distortion. Maintaining stable pulse characteristics from laser to laser and over the laser lifetime becomes usually more difficult to achieve as the number of coupled operating parameters increases.

There remains a need for a pulsed laser system which is able to provide high power pulses suitable for material processing applications or the like.

SUMMARY OF THE INVENTION

In accordance with one aspect of the present invention, there is provided a pulsed fiber laser oscillator, including a light generating module generating optical pulses at a repetition rate. Each optical pulse has a spectral profile, an amplitude profile and a pulse duration. The oscillator further includes a spectrum tailoring module for tailoring the spectral profile of the optical pulses. The spectrum tailoring module has at least one phase modulator for imposing a time-dependent phase variation on each of the pulses. Synchronizing means are provided for activating the phase modulator in synchronization with the optical pulses.

In accordance with another aspect of the invention, there is also provided a method for providing high power optical pulses while avoiding the onset of non-linear effects, the method comprising:
  a) generating seed optical pulses at a repetition rate, each seed optical pulse having a spectral profile, an amplitude profile and a pulse duration;
  b) broadening the spectral profile of the seed optical pulses, said broadening comprising propagating the seed optical pulses through at least one phase modulator imposing a time-dependent phase variation on each of said pulses, thereby obtaining spectrally broadened optical pulses, said broadening comprising activating the phase modulator in synchronization with the seed optical pulses; and
  c) amplifying said broadened optical pulses, thereby obtaining said high power optical pulses.

Other features and advantages of the present invention will be better understood upon reading of preferred embodiments thereof with reference to the appended drawings.

BRIEF DESCRIPTION OF THE DRAWING

FIG. 8B is a timing diagram for the laser oscillator of FIG. 8A.

FIG. 9B is a timing diagram for the laser oscillator of FIG. 9A.

FIG. 10B is a timing diagram for the laser oscillator of FIG. 10A.

DESCRIPTION OF EMBODIMENTS OF THE INVENTION

Embodiments of the present invention generally provide pulse generating methods and pulsed fiber laser oscillators for laser systems adapted for high power applications such as memory repair, milling, micro-fabrication, drilling and other material processing applications. It will be understood that embodiments of the present invention may also be used in other contexts such as remote sensing or any other application which may benefit from high power pulses having good optical characteristics.

The expression "oscillator" is understood to refer to the portion of a laser system which generates light pulses. The oscillator may include a laser cavity or alternatively be based on fluorescent emissions. The oscillator may be part of a larger system including amplifying, beam shaping or any other optical component further defining the properties of the optical pulses generated by the oscillator.

The laser oscillators according to embodiments of the present invention are preferably fiber-based, which is understood to mean that light circulating in the oscillator is generally guided by optical fiber. It is however not excluded from the scope of the invention that the oscillator may include components external to optical fibers. In addition, the components of the laser oscillator may be embodied in more than one length of optical fiber, coupled together through known techniques such as fiber pigtails, fused coupling, mechanical couplers and the like.

The optical fiber or fibers embodying each components of the laser oscillator may have any appropriate structure. Depending on its function the optical fiber may be single mode or multimode, with a single or multiple cladding. It may be embodied by a standard fiber, a polarisation maintaining (PM) fiber, a microstructured (or "holey") fiber or any other appropriate specialized type of fiber. It may be made of any suitable materials such as pure silica, doped silica, composite glasses or sapphire.

Laser Oscillators

Figure 1:
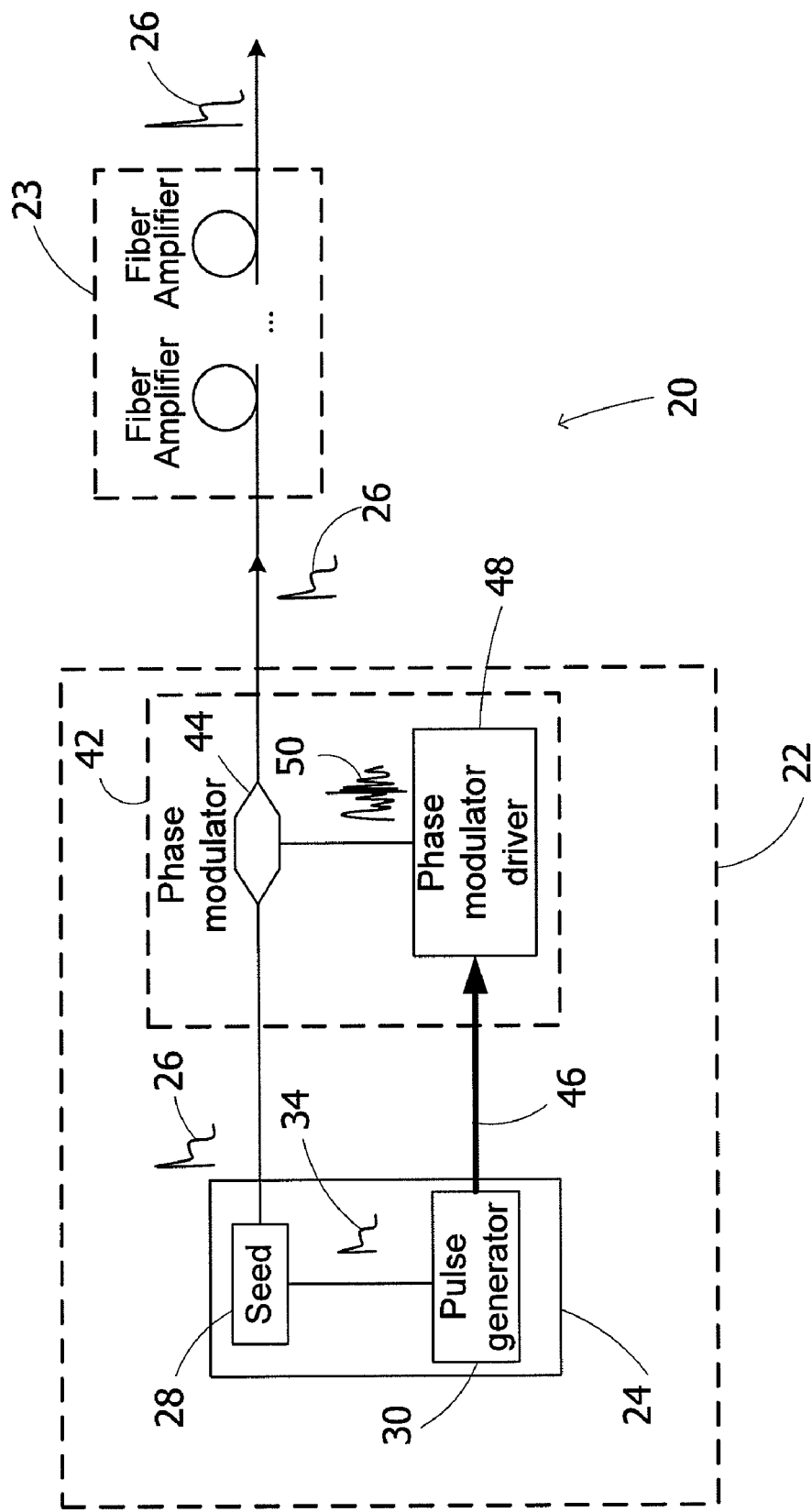
FIG. 1 is a schematized representation of a laser system according to an embodiment of the invention.

Referring to FIG. 1, there is shown a pulsed fiber laser system 20 having a Master Oscillator Power Amplifier (MOPA) architecture, including a Master Oscillator 22 according to one embodiment of the invention followed by a fiber Power Amplifier 23. The oscillator 22 first includes a light generating module 24, which generates optical pulses 26. The light generating module 24 determines the characteristics of the optical pulses 26 outputted thereby such as their repetition rate, pulse duration, spectral profile and amplitude profile. Preferably, the light generating module 24 includes a seed assembly 28 generating the optical pulses 26 and a pulse generator 30 collaborating with the seed assembly 28 to control the pulse characteristics.

The laser oscillator 22 further includes a spectrum tailoring module 42 for tailoring the spectral profile of the optical pulses 26 generated by the light generating module 24. The spectrum tailoring module 42 includes a phase modulator 44 which imposes a time-dependent phase variation on each optical pulse 26 therethrough. Preferably, a phase modulator driver 48 drives the activation of the phase modulator 44 through a phase variation drive signal 50 providing the desired phase variation.

Figure 2:
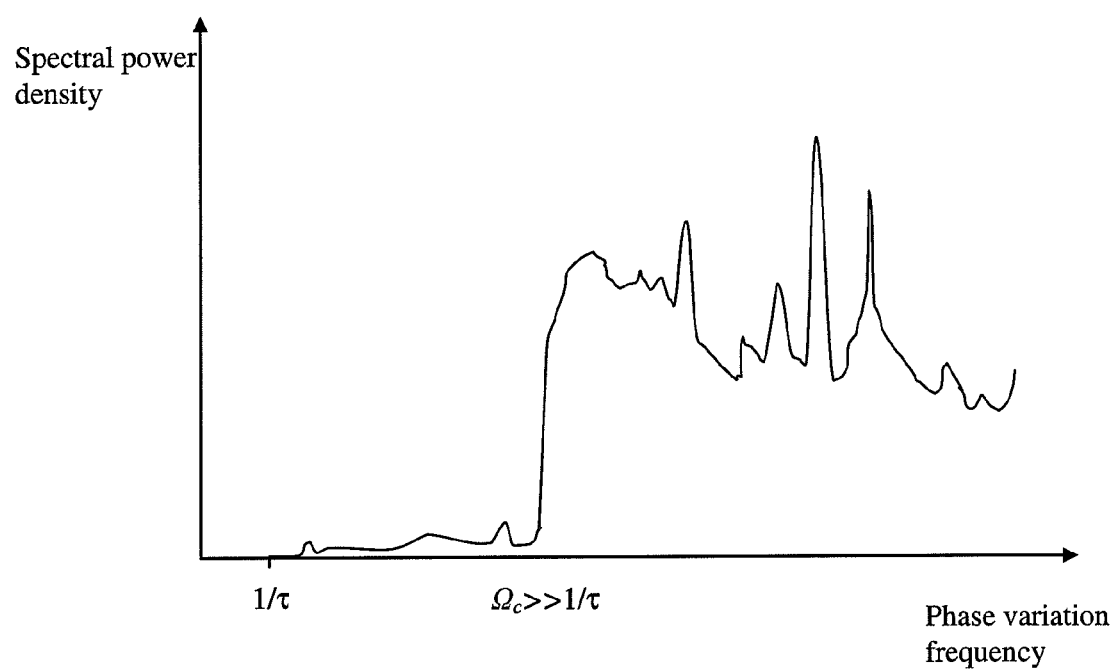
FIG. 2 is a schematic representation of an example of RF frequency spectrum corresponding to a time-dependent phase variation characterized by a plurality of frequencies.

By the expression "time-dependent phase variation", it is understood that the spectrum tailoring module imposes a phase component on the electrical field of the optical pulses which is not constant over the duration of each pulse. The time-dependent phase variation may be periodic, quasi-periodic, linear or have any other appropriate time-dependence. Preferably, the phase variation drive signal 50 is a RF signal characterised by one or more frequencies in the range of 100 MHz to 100 GHz. FIG. 2 illustrates the general case of an RF spectrum corresponding to a phase variation drive signal having a plurality (in this case a continuum) of frequencies.

The phase modulator 44 may be embodied by an electro-optic component based modulator such as well known in the art. The electro-optical material included in the phase modulator can be $LiNbO_3$, $LiTaO_3$, $KNbO_3$ or any other appropriate nonlinear material. Alternatively, the phase modulator may be based on an acousto-optical component such as an acousto-optic modulator. In some embodiments, as exemplified in FIG. 18, the spectrum tailoring module 42 may include more than one phase modulator 44 in a cascade, each applying a phase variation to the optical pulses therethrough so that their combined effect on the phase of the optical pulses results in the desired tailoring of their spectral profile. Alternatively or additionally, the spectrum tailoring module 42 may be configured so that the light pulses make more than one pass through one of more phase modulator 44, as will be explained further below with respect to the embodiments of FIGS. 16A and 19.

Spectrum Tailoring

In order to explain the principles behind the spectrum tailoring capability provided by phase modulation in the context of pulsed fiber laser sources, the simple case of a sinusoidal, single frequency ($\Omega$) phase variation is first presented. At the input of the phase modulator 44 each optical pulse 26 generally has a spectral profile centered at an optical frequency $\nu$ with a linewidth $\Delta\nu$. When applying the single frequency phase variation, additional spectral components can be added to the pulse spectral profile under certain conditions specific to the characteristics of the pulse and of the phase variation, thereby broadening the pulse spectral profile.

In general, the electric field amplitude time dependence of the optical pulses is given by:

$$E(t) = E_0 \sin(2\pi\nu \times t + \phi(t)) \quad (1)$$

where $\phi(t)$ is the time-dependent phase term that varies when applying the phase variation. In the single frequency example, this term has the profile:

$$\phi(t) = \phi_{peak} \sin(2\pi\Omega \times t + \phi_0) \quad (2)$$

where $\phi_0$ is the initial phase and $\phi_{peak}$ the peak phase deviation. The peak phase deviation obtained when applying a peak voltage $V_{peak}$ on the phase modulator 44 is given by:

$$\phi_{peak} = \pi \times \frac{V_{peak}}{V_\pi} \quad (3)$$

where $V_\pi$ is a characteristic of the phase modulator 44. The Fourier decomposition of E(t) with $\phi$(t) given by equation (2) is a well known result of applied mathematics (see for example Bruce Carlson, "Communication systems—An introduction to Signals and Noise in Electrical Communication", McGraw-Hill, New York, 1986, chapter 7). In principle, under adequate phase variation conditions, an infinite number of sideband lines at optical frequencies $\nu \pm n\Omega$, where n is an integer, appear in the spectral profile of the optical pulses. The spectral power density associated with a side band of index n is dependent upon the value of $\phi_{peak}$. In general, for $n > \phi_{peak}$, the spectral power density decreases rapidly as n increases. Typical spectral profiles of the optical pulses after tailoring are shown in FIGS. 3A to 3D, for various values of $\phi_{peak}$ and a same value of $\Omega$. It can be easily understood that by simply choosing appropriate values for both parameters of the phase variation, $\Omega$ and $\phi_{peak}$, tailoring of the spectral profile of the optical pulses is readily achieved.

In some embodiments, for example with respect to applications where frequency conversion is required, it may be preferable for the resulting spectral profile of the optical pulses to be uniform along the pulse. This may be achieved by ensuring that the spectrum tailoring takes place within a duration significantly shorter than the pulse duration. This will be the case if the condition $\Omega \gg 1/\tau$ is satisfied, where $\tau$ is the pulse duration. For example, for 10 ns pulses this condition corresponds to $\Omega \gg 100$ MHz, and ideally for such pulses $\Omega$ is of the order of at least 1 GHz.

Using a high phase variation frequency according to the condition above may further be advantageous in embodiments where the initial phase of the phase variation with respect to the optical pulse leading edge is not kept fixed or not controlled (parameter $\phi_0$ in equation (2)). At lower phase variation frequencies, the optical frequency sweep provided by the phase variation will in general vary differently along the pulse from pulse to pulse, which could lead to a situation where the spectral characteristics of the pulse can change significantly from pulse to pulse in an uncontrolled manner.

In more complex embodiments, the phase variation may differ from the simple oscillatory case described above, providing an even greater versatility in the spectrum tailoring capacities of the device. The profile of the phase variation may be adapted in view of the requirements of the application to which the laser oscillator is destined.

In the general case, the phase variation signal $\phi$(t) spectrum can be considered to include a spectrum of n discrete frequencies $\Omega_1, \Omega_2, \Omega_3, \ldots, \Omega_n$ or a continuum of frequencies. In the different embodiments of the present invention, the phase variation preferably has a spectrum of frequencies having a lower cut-off frequency $\Omega_c$ significantly larger than $1/\tau$. An example of such an RF spectrum is illustrated in FIG. 2.

Figure 4A:
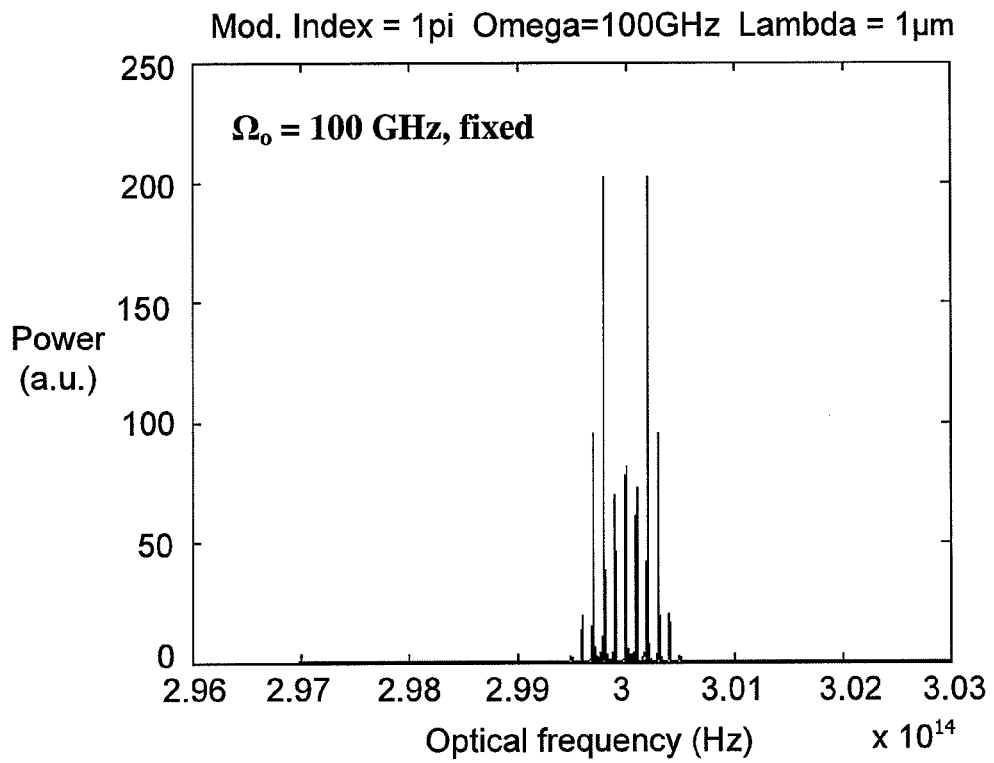
FIGS. 4A and 4B are examples of optical spectral profiles obtained respectively with and without modulation of the frequency of the phase variation.
Figure 4B:
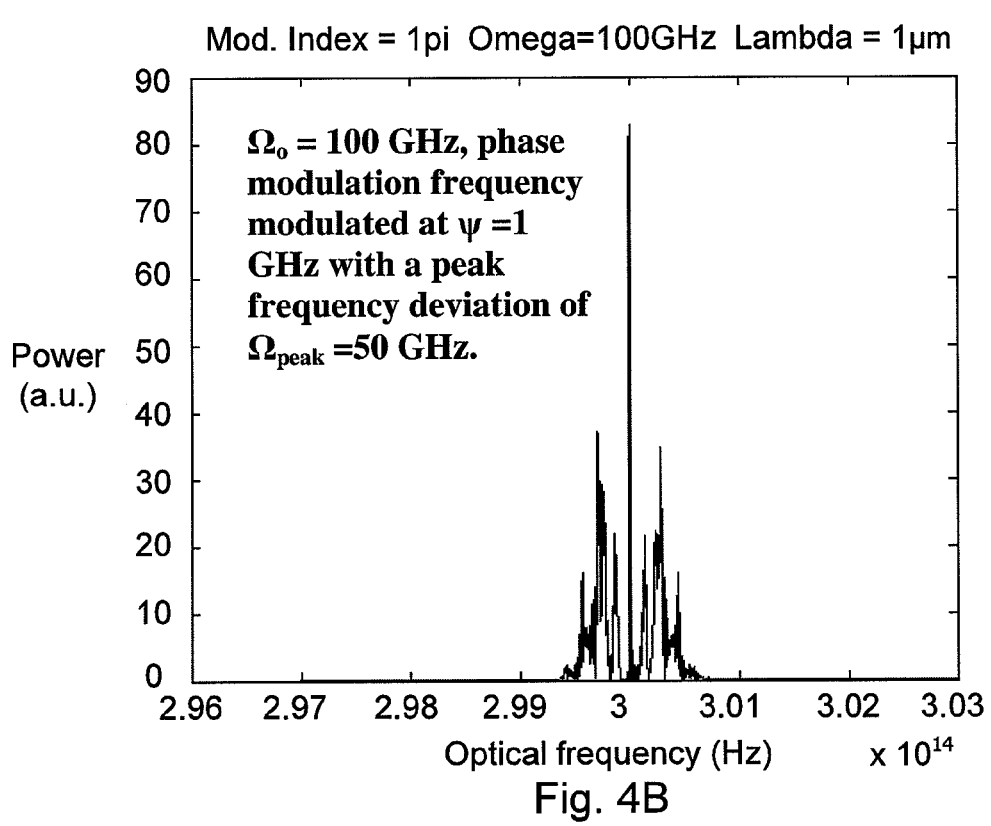

In some embodiments of the invention, the phase variation frequency may itself be time-dependent, that is, $\Omega = f(t)$. For example, f(t) can be a sinusoid, leading to $$\phi(t) = \phi_{peak} \sin(2\pi(\Omega_0 + \Omega_{peak} \sin(2\pi\Psi t)) \times t + \phi_0) \quad (4)$$

where $\Omega_0$ is the central phase variation frequency, speak is the maximum deviation of $\Omega$ with respect to $\Omega_0$ and $\Psi$ is the frequency at which the phase modulation frequency is varied. FIG. 4B shows an example of spectral profile which can be obtained with this scheme, compared to the corresponding case where the phase variation frequency is fixed as shown in FIG. 4A. As can be seen in the figure, the modulation of the phase variation frequency allows for the distribution of the optical power among many additional spectral components with respect to the fixed phase variation frequency case, which reduces the maximum spectral power density, shown on the vertical axis, for a fixed spectral band. Such a reduction can be advantageously used for mitigating SBS in high power fiber amplifiers.

Synchronously Gated Phase Variation

Referring again to FIG. 1, the pulsed laser oscillator 22 further includes means for synchronizing the activation of the phase modulator 44 with the arrival of the optical pulses 26 thereat. This synchronization is an advantageous aspect of the present invention as it allows for using low average power RF amplifiers to drive the phase modulators and limits the thermal stress on the phase modulators, which is beneficial in terms of system cost, complexity and reliability, as will be explained below. The synchronizing means are conceptually represented by the arrow 46 extending between the pulse generator 30 and the phase modulator driver 48 and one skilled in the art will understand that any combination of components and signals allowing the control of the timing of the activation of the phase modulator 44 in relation to the propagation of the optical pulses 26 therethrough could be used without departing from the scope of the present invention.

Figure 5:
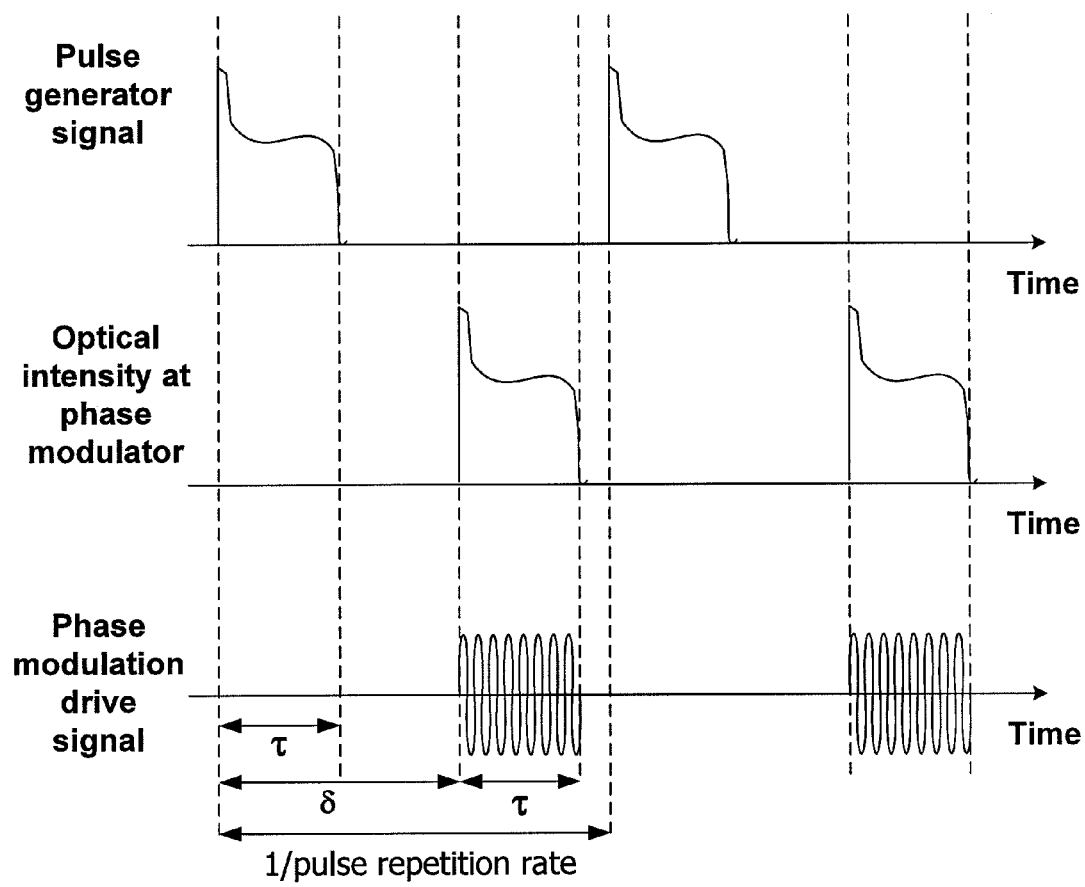
FIG. 5 is a timing diagram exemplifying the operation of components of an oscillator according to embodiments of the invention.

In accordance with the synchronisation means, the phase modulation 44 is activated to the "on" state while an optical pulse 26 propagates therethrough and is kept in the "off" state during inter-pulse period. The expression "synchronously gated phase variation" is used herein to refer to this regime of operation. A conceptual timing diagram is represented in FIG. 5 for a laser operating at a pulse repetition rate PRR. In this example, the phase modulation drive signal is enabled synchronously with the optical pulse for a duration approximately equal to the pulse duration $\tau$. The delay $\delta$ is in general dependent upon the optical pulse propagation delay between the seed assembly 28 and the phase modulator 44 and also depends upon the electrical propagation delays between the pulse generator 30, the seed assembly 28 and the phase modulator driver 48. Preferably, the delay $\delta$ is adjusted in order to make sure that the phase variation is active while an optical pulse is transmitted through the phase modulator and not active otherwise. For example, for a pulse duration of 10 ns and for a pulse repetition rate of 100 kHz, typical for high power pulsed fiber lasers, the duty cycle is only 0.1%, which mean that the phase modulator 44 can be advantageously kept in the "off" state for up to 99.9% of the time using this method. In some embodiments, the phase modulator is activated synchronously with the optical pulses for a delay that is slightly longer than the pulse duration so as to provide a security margin with respect to the possible variations associated to jitter or to other time-related tolerances. In embodiments where the optical pulse duration can be adjusted in between a minimum $\tau_{min}$ and a maximum $\tau_{max}$, the phase modulator can be driven synchronously with the optical pulses for a duration approximately equal to $\tau_{max}$, this duration being kept constant for any chosen pulse duration. Alternatively the duration of the phase variation can be set to be approximately equal to the optical pulse duration over the whole range $\tau_{min}$ to $\tau_{max}$, which means that it is adjusted accordingly every time the optical pulse duration is modified. Depending upon the applications, the initial phase of the phase modulation signal with respect to the optical pulse leading edge can be controlled or not. All of these variants and equivalents thereof are considered activations of the phase modulator "in synchronization" with the optical pulses.

Figure 6:
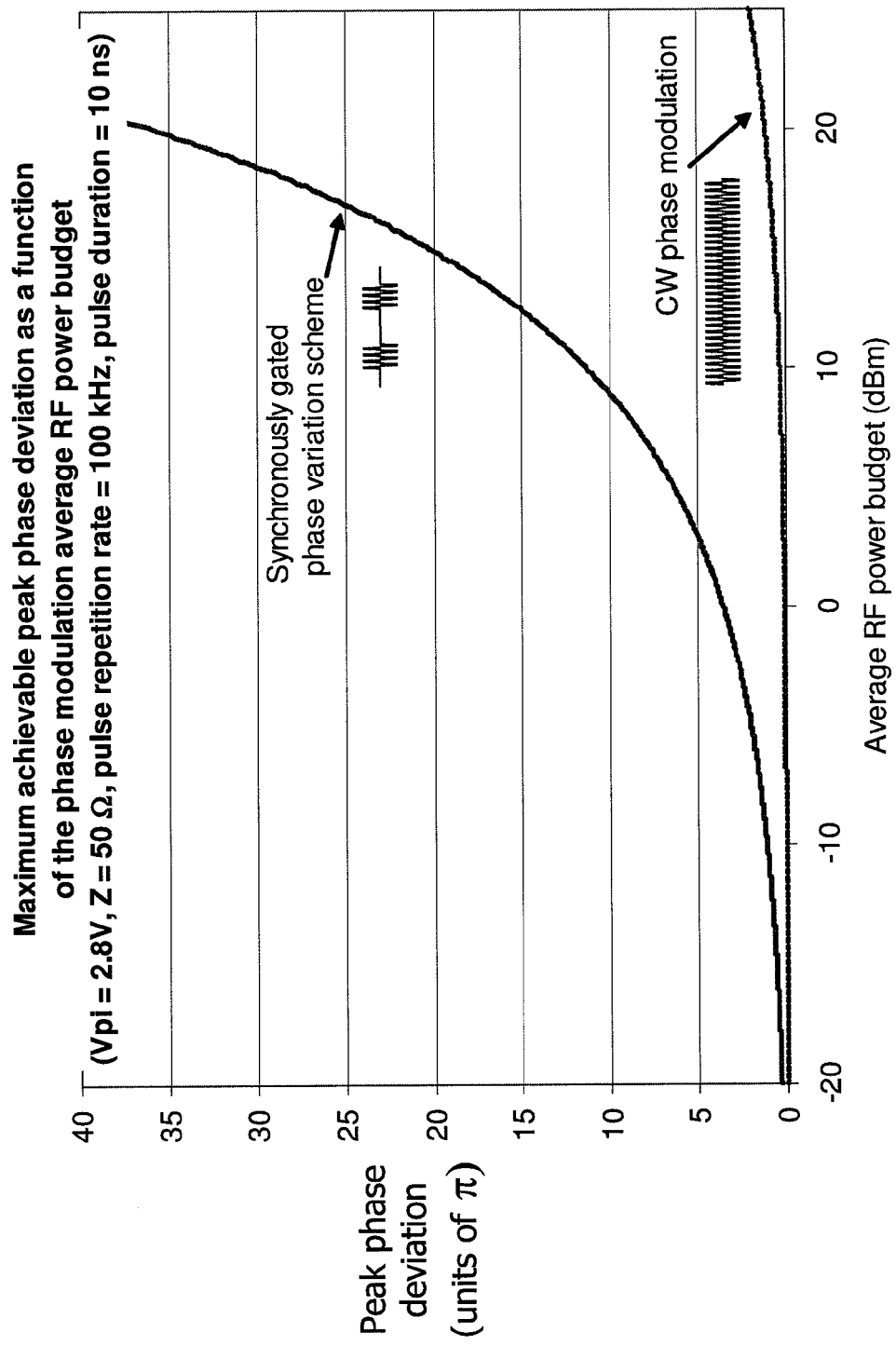
FIG. 6 is a graph comparing the peak phase deviation that can be obtained with a given average RF power budget for a synchronously gated sinusoidal phase variation with respect to the case where the phase variation is enabled at all times (CW phase modulation scheme).

Advantageously, the synchronously gated phase variation scheme considerably reduces the RF average power level required for efficiently tailoring the pulse spectral profile, as the phase modulation is active for only a small fraction of time with respect to a continuous wave phase modulation scheme (phase modulation active at all times). This much lower RF power consumption is advantageous in terms of cost and reliability. For example, the power dissipated in the phase modulator can be considerably reduced (three orders of magnitude reduction in the example mentioned above), which significantly mitigates the risk of experiencing thermal issues with the device. Also, as the required RF power is much lower than it is in the CW regime, much higher peak phase deviations can be obtained with a given amount of average RF power, thereby allowing broader spectra and more efficient SBS suppression. FIG. 6 exemplifies this benefit for the case of a single frequency, sinusoidal phase variation. In FIG. 6 the synchronously gated phase variation scheme is compared with the CW phase modulation scheme in terms of the peak phase deviation (which is proportional to the spectral broadening) that can be achieved as a function of the available RF average power budget. It is clear from that example that the synchronously gated time-dependent phase variation authorizes much broader spectra when compared with the CW scheme for a given RF power budget. For example, a modest RF power budget of 10 dBm is sufficient to enable a peak phase deviation as large as $11\pi$ with the synchronously gated regime, whereas it is limited to about $0.4\,\pi$ in the CW regime.

In different embodiments of the present invention using the synchronously gated phase variation scheme, the tailoring of the spectral profile of the optical pulses may be accomplished by controlling the phase variation parameters from pulse to pulse using high speed electronics embodying the pulse generator, phase modulator driver and other related components. A suitable platform is for example disclosed in U.S. provisional patent application No. 61/076337 by Deladurantaye P. et al., filed on 27 Jun. 2008 and entitled "Embedded digital laser pulse shaping platform and method". In some embodiments, the phase variation characteristics as well as the pulse amplitude profile are both dynamically controlled from pulse to pulse, thereby allowing the production of extremely flexible and agile pulsed fiber lasers in both the time domain and the optical frequency domain. Examples of such embodiments are presented below.

Examples of Embodiments

Various non-limitative embodiments of the invention will be described below by way of example.

Figure 7:
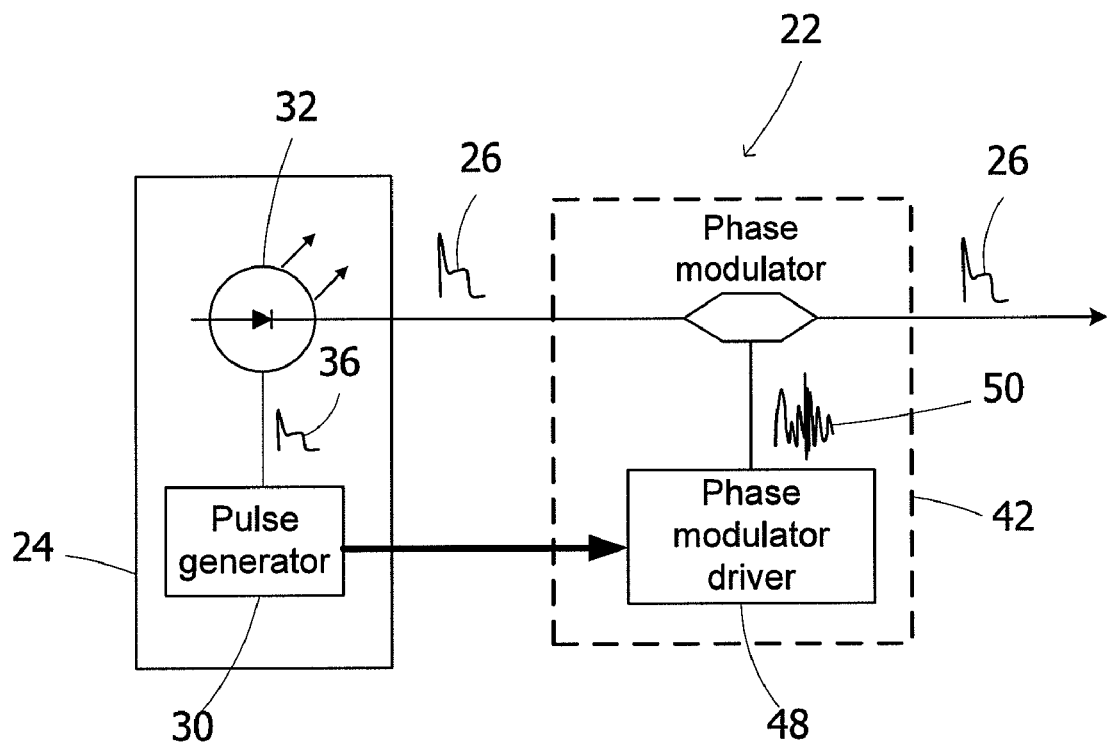
FIG. 7 is a schematized representation of a laser oscillator according to an embodiment of the invention, using a pulsed seed source.

Referring to FIG. 7, there is illustrated in an example of a laser oscillator 22 where the seed assembly is embodied by a pulsed seed source 32, which is electrically driven by the pulse generator 30. The pulse seed source 32 may be a semiconductor laser diode of any appropriate configuration such as a Fabry-Perot cavity, a distributed-feedback diode, an external-cavity diode laser (ECDL), etc. The semiconductor diode may be fiber-based and guide light in a single mode in a transverse or longitudinal regime. The pulse generator 30 may for example be embodied by a device or platform apt to generate a pulse drive signal 36 of appropriate characteristics, and is preferably based on high speed electronics. In the embodiment of FIG. 7, the drive signal 36 should be tailored to vary the drive current of the pulsed seed source 32 in order for the optical pulses 26 generated thereby to have the desired shape. One skilled in the art will readily understand that the optical characteristics of the optical pulses 26 will depend on a number of factors such as the complex impedance of the pulsed seed source 32, which is itself dependent on the physics of the cavity of this source and on the diode package.

Figure 8A:
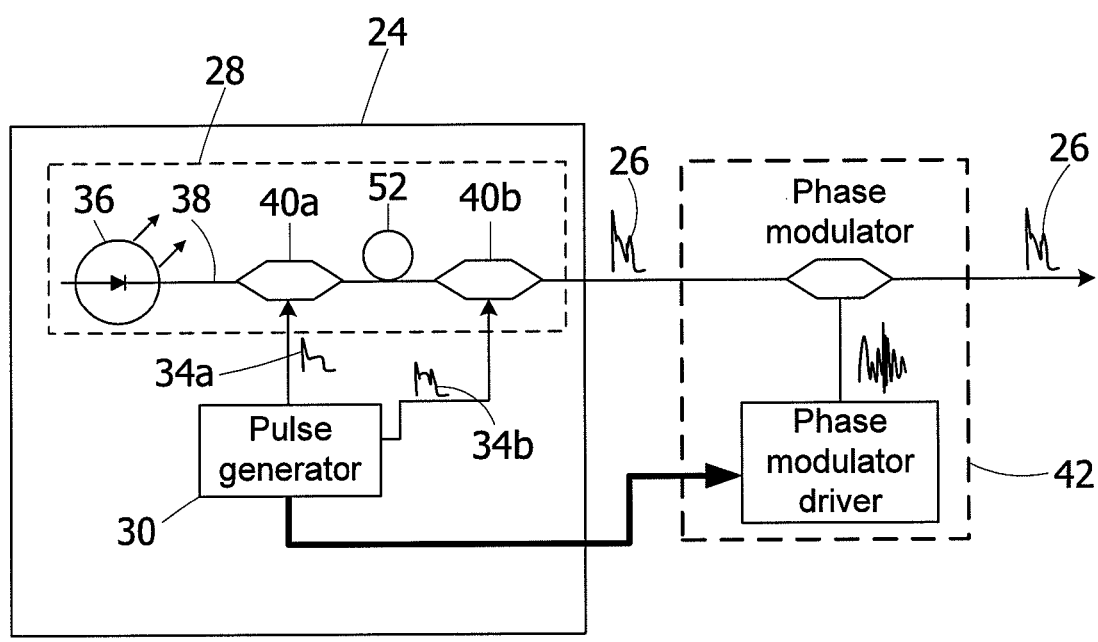
FIG. 8A is a schematized representation of a laser oscillator using a "MOPA" configuration.
Figure 9A:
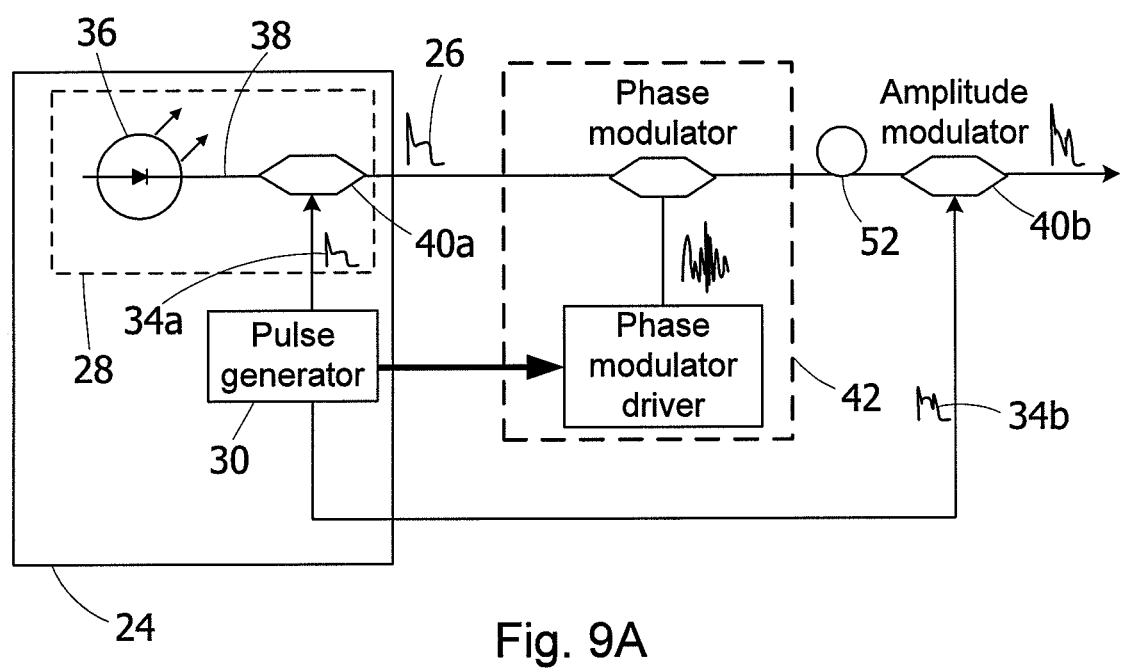
FIG. 9A, is a schematized representation of a laser oscillator using a "MOPA" configuration according to another embodiment.
Figure 10A:
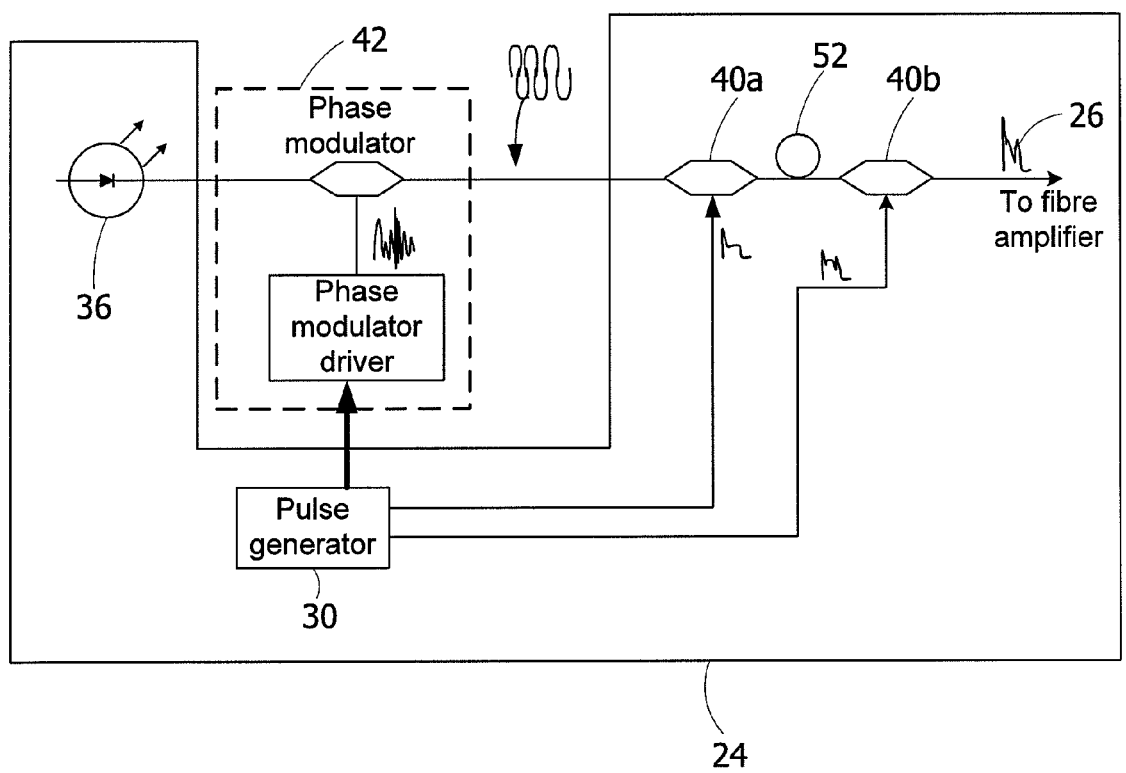
FIG. 10A, is a schematized representation of a laser oscillator using a "MOPA" configuration according to yet another embodiment.

FIGS. 8A and 9A show alternative embodiments where the seed assembly 28 includes a continuous light source 36 generating a continuous light beam 38, followed by first and second amplitude modulators 40a, 40b modulating the continuous light beam 38 to provide the optical pulses 26. In both embodiments, the pulse generator 30 sends a first drive signal 34a to a first amplitude modulator 40a which is external to the continuous seed light source 36, and the first drive signal 34a controls the opening of the first amplitude modulator 40 to allow light therethrough according to the desired output shape of the optical pulses 26 formed in this manner. A second drive signal 34b is provided to a second amplitude modulator 40b to open the same in complete or partial synchronization with the arrival of the optical pulses 26 thereat, providing a greater resolution and versatility in the characteristics of the resulting pulses. Such a configuration is described in more detail in U.S. patent application US-2006-0159138-A1 (DELADURANTAYE et al), the contents of which is incorporated herein by reference in its entirety. In the embodiment of FIG. 8A, both amplitude modulators 40a and 40b are positioned upstream the spectrum tailoring module 42, and an optical amplifier 52 is placed in between. The amplifier may for example be embodied by a pumped gain medium such as a rare-earth doped length of optical fiber. In the embodiment of FIG. 9A, the second amplitude modulator 40b is positioned downstream the spectrum tailoring module 42, so that the final temporal shaping of the optical pulses is performed after the spectral tailoring thereof. FIG. 10A shows an other embodiment, where the spectrum tailoring module 42 is positioned upstream both modulators 40a and 40b. In this particular embodiment, the synchronously gated regime is made possible by driving the spectrum tailoring module 42 first and then synchronizing the two amplitude modulators 40a and 40b in order to generate and shape optical pulses 26 in synchronicity with the time windows for which the continuous light beam phase has been varied by the spectrum tailoring module 42. An optical amplifier 52 may also be provided in those embodiments. FIGS. 8B, 9B and 10B illustrate examples of timing diagrams corresponding to the embodiments of FIGS. 8A, 9A and 10A respectively.

It will be noted that either type of seed source, whether pulsed 32 or continuous 36 may be tunable in wavelength, according to techniques known in the art. Alternatively, external spectral tuning components such as filters, gratings or the like (not shown) may be provided externally to the seed source.

The phase modulator driver preferably includes a source module which generates a source signal and a high speed switching module which selectively transmits this source signal from the source module to the phase modulator. The high speed switching module is activated by the pulse synchronization signal. A variable gain amplifying module is also preferably provided and disposed between the high speed switching module and the phase modulator.

Figure 11A:
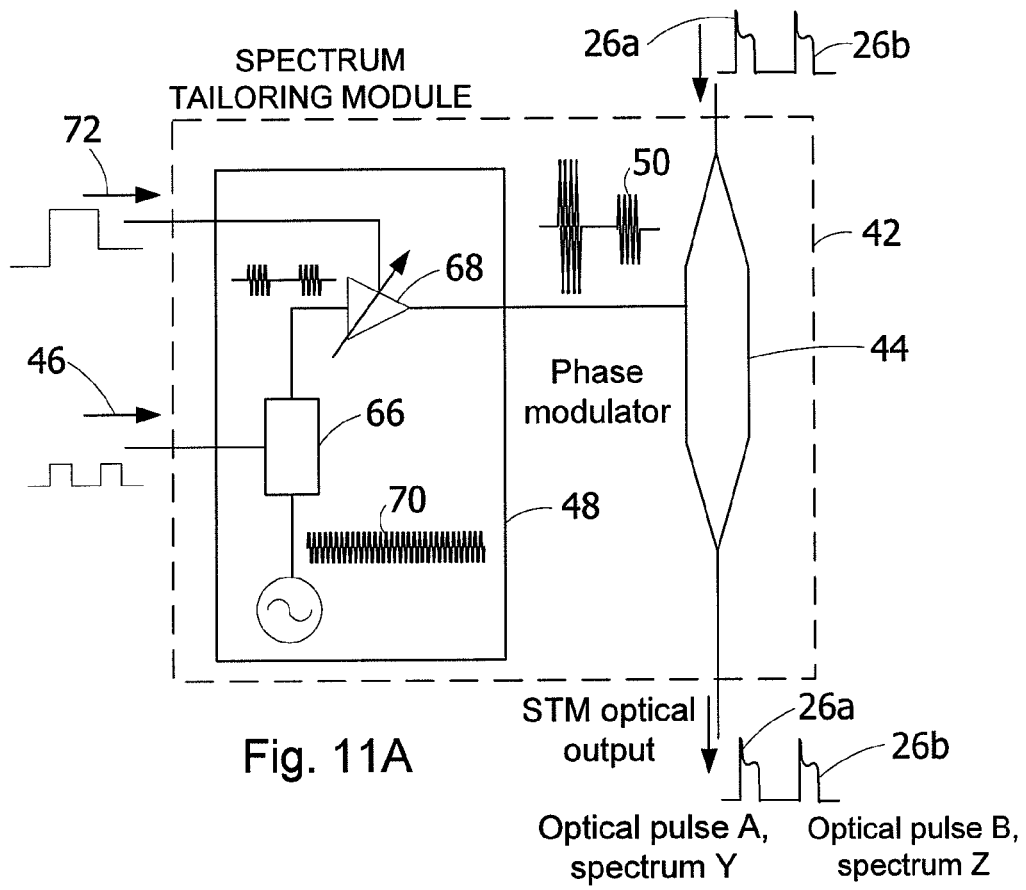
FIG. 11A is a schematized representation of a phase modulator driver according to one embodiment of the invention.
Figure 11B:
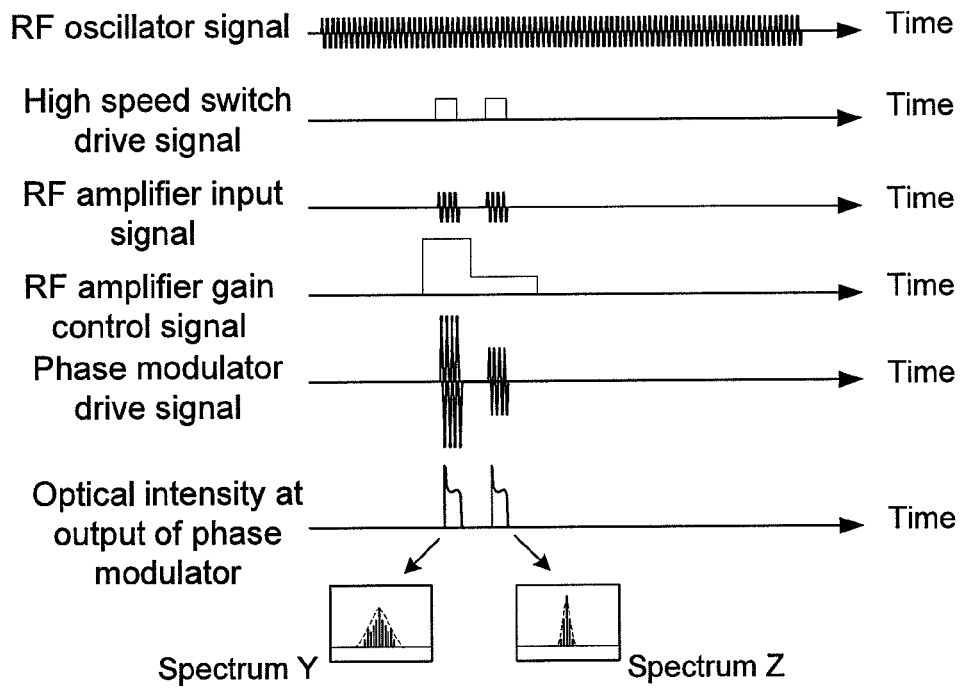
FIG. 11B shows the time variation of the various signals transmitted within the phase modulator driver of FIG. 11A.

Referring to FIG. 11A, in their simplest form the three modules of the phase modulator driver 48 may be embodied by an oscillator 64, a variable gain amplifier 68 and a high-speed switch 66. In one variant of this embodiment, the source signal provided by the oscillator 64 is an oscillating signal 70 at a fixed frequency which defines the frequency $\Omega$ of the phase variation drive signal 50. The phase variation peak amplitude can be adjusted by controlling the gain of the amplifier 68, which may advantageously also be activated synchronously with the optical pulses as shown in the timing diagram of FIG. 11B. In terms of RF spectrum as represented in FIG. 2, this case corresponds to the case of a single peak of frequency $\Omega$ with variable intensity from pulse to pulse. The high speed switch 66 is preferably activated by the pulse synchronization signal 46 so as to selectively transmit the oscillating signal 70 through the amplifier 68 to the phase modulator 44 only when an optical pulse is present at its input, in order to minimize the RF power consumption of the device as explained above.

Figure 3A:
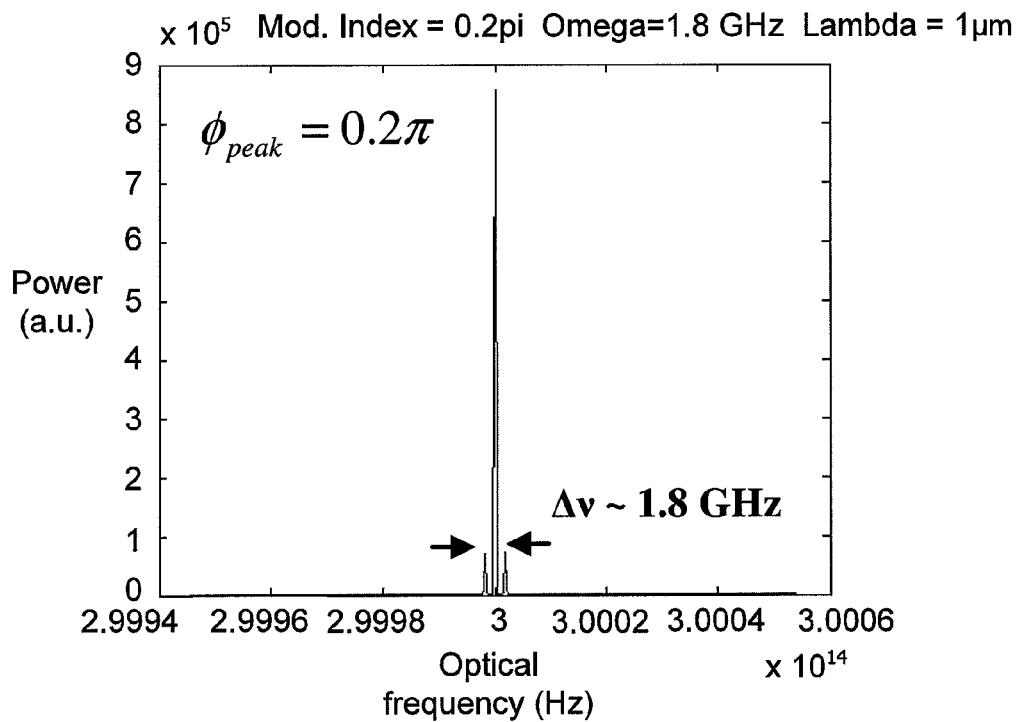
FIGS. 3A to 3D are graphs showing the calculated tailored spectra obtained with a single frequency sinusoidal phase variation, for different values of the peak phase deviation.
Figure 3B:
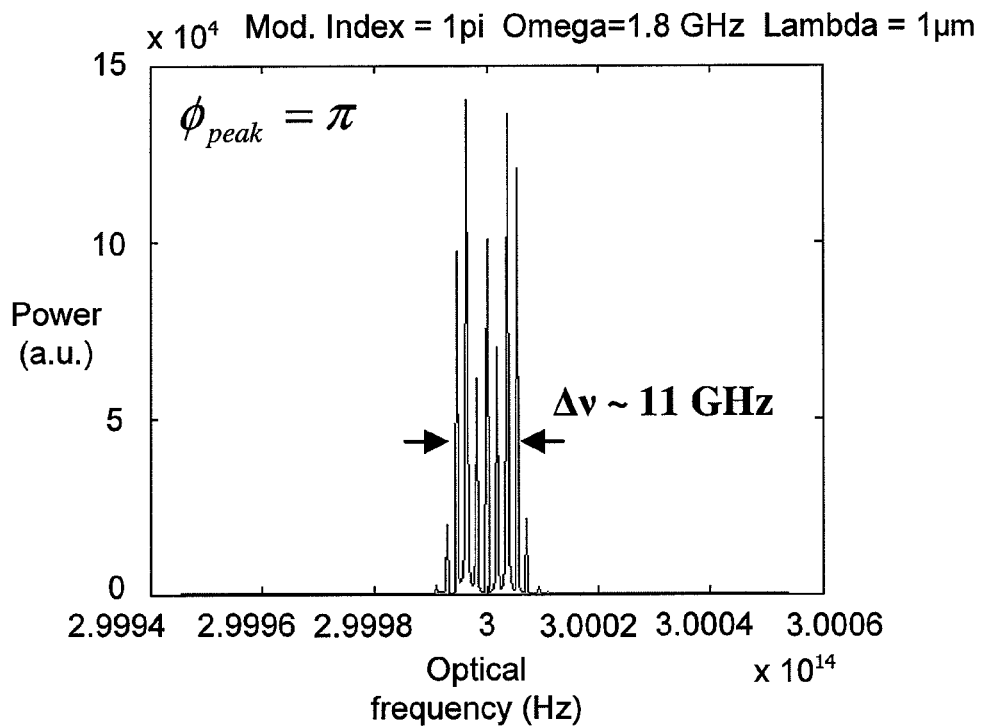
Figure 3C:
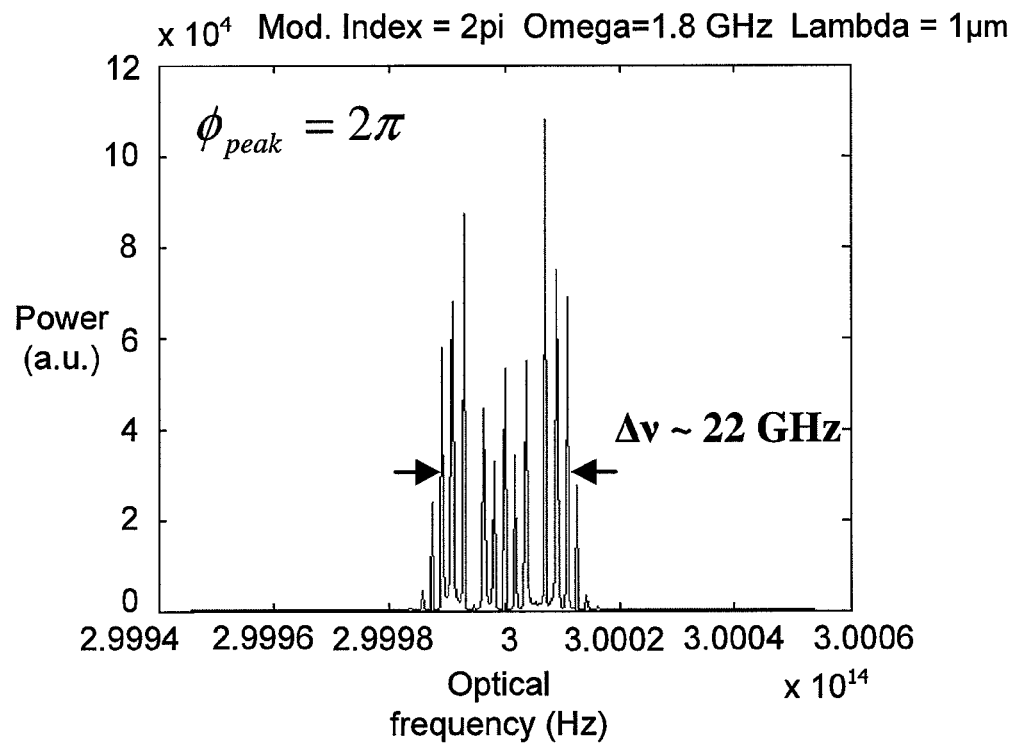
Figure 3D:
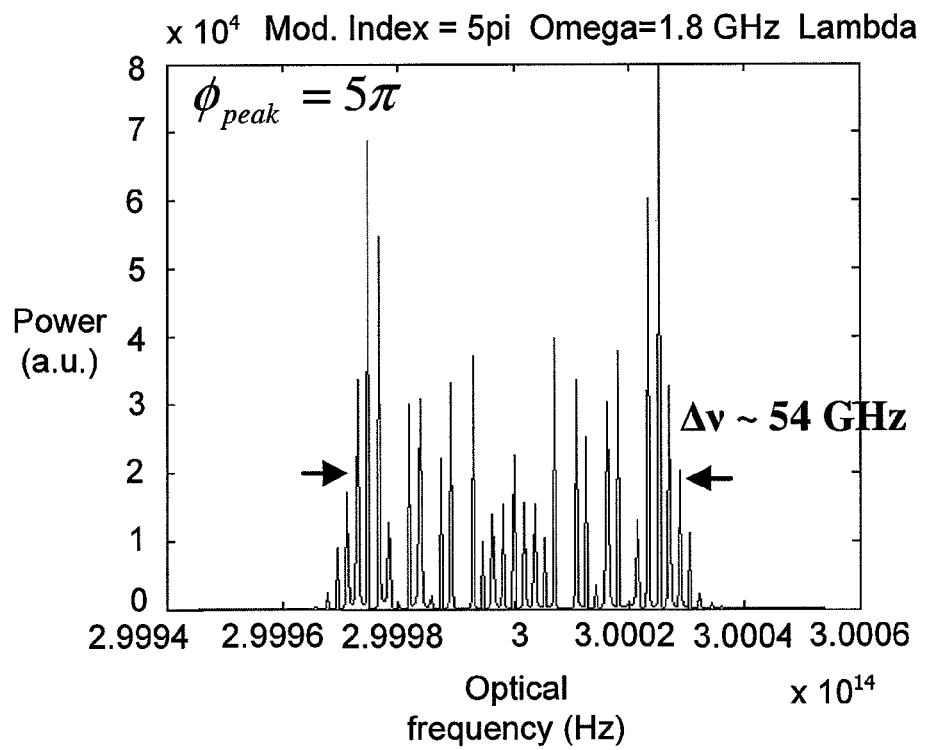

In the embodiment of FIG. 11A, the pulse to pulse spectrum tailoring capability is exemplified for two consecutive pulses 26A and 26B. Before entering the spectrum tailoring module 42, both pulses 26A and 26B have an identical spectral profile (or spectrum) X. The gain of the amplifier 68 may be controlled by a gain signal 72. In this example, the gain signal 72 sets the gain of the amplifier 68 to two different values for the time windows corresponding to pulses 26A and 26B, respectively, the gain being set to a lower value for pulse 26B with respect to pulse 26A. Consequently, the phase modulator 44 is driven with a higher phase variation peak amplitude for pulse 26A than for pulse 26B, resulting in a more important peak phase deviation for pulse 26A than for pulse 26B. At the output of the spectrum tailoring module 42, the spectrum Y obtained for pulse 26A is broader than the spectrum Z of pulse 26B, as the broadening is approximately proportional to the peak phase deviation, as can be seen in FIGS. 3A o 3D. In addition to the spectral width, both pulses also have different spectral profiles in general, as also shown in FIGS. 3A through 3D.

Figure 12A:
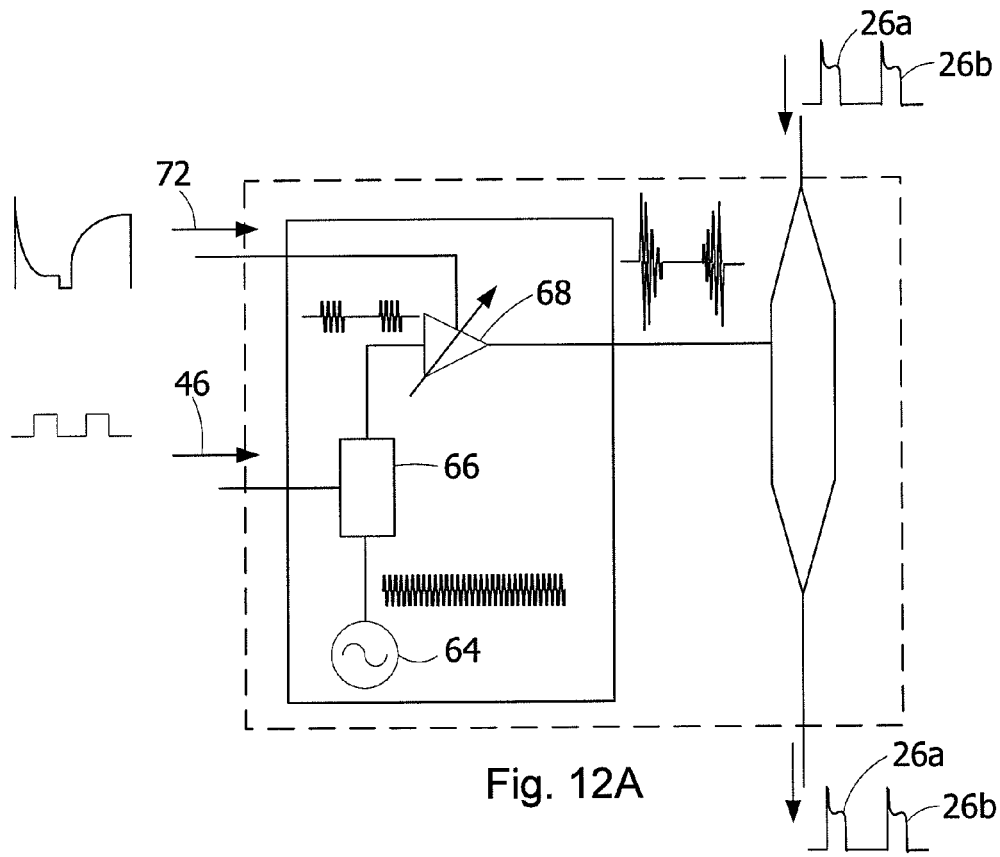
FIG. 12A is a schematized representation of a phase modulator driver according to another embodiment of the invention.
Figure 12B:
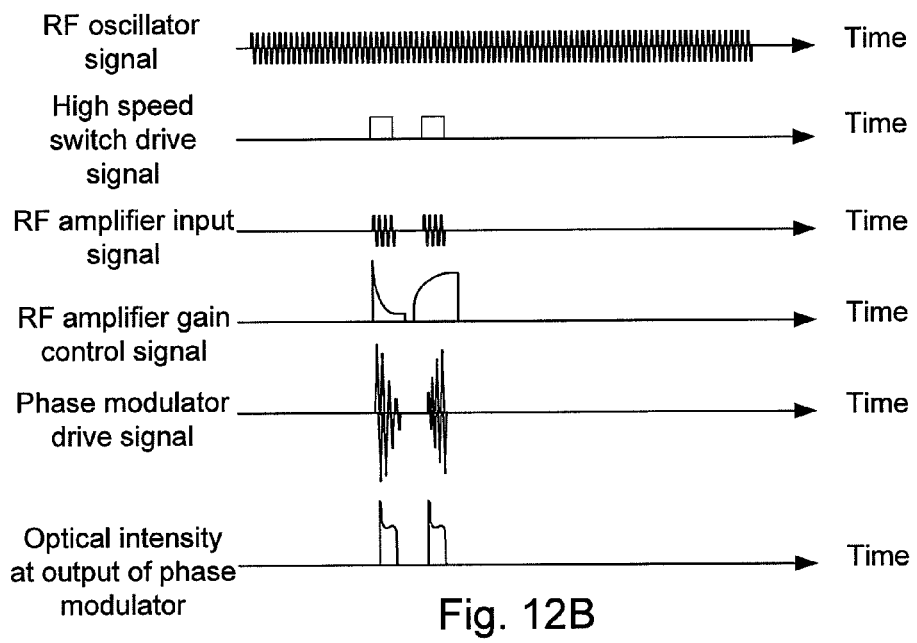
FIG. 12B shows the time variation of the various signals transmitted within the phase modulator driver of FIG. 12A.

FIG. 12A shows an alternative embodiment of FIG. 11A where the synchronized gain control signal of the RF amplifier has tailored characteristics in the time domain. In the example of FIG. 12A, the amplitude profile of this signal is tailored in a different manner for two consecutive pulses. Consequently, the amplitude of the phase variation can be varied differently along each pulse using this scheme, which corresponds to different pulse spectral profiles having variable spectral linewidths along each pulse. In the presented example, once transmitted by the spectrum tailoring module, the optical pulse A is characterized by a broader linewidth at the beginning of the pulse and a narrower linewidth at the end of the pulse. On the other hand, optical pulse B has a narrower linewidth at the beginning of the pulse and a broader linewidth at the end of the pulse. Depending on the time domain characteristics of the RF amplifier gain control signal (monotonic, periodic, etc.), various time-dependent spectral profiles can be produced along the optical pulses, and from pulse to pulse. When implemented in a system that also provides a pulse shaping capability, as taught for example in U.S. provisional patent application No. 61/076337 by Deladurantaye P. et al., filed on 27 Jun. 2008 and entitled "Embedded digital laser pulse shaping platform and method", very flexible pulsed fiber oscillators offering both tailored pulse shapes and tailored pulse spectra can be produced.

Figure 13A:
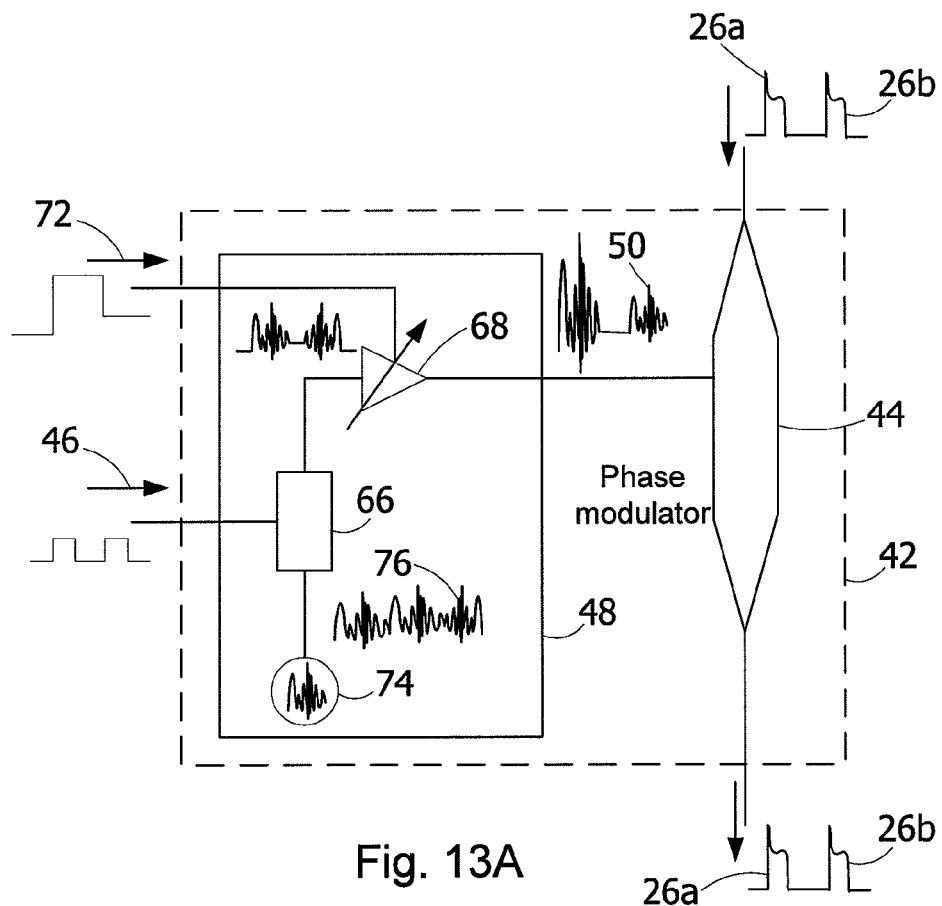
FIG. 13A is a schematized representation of a phase modulator driver according to another embodiment of the invention.
Figure 13B:
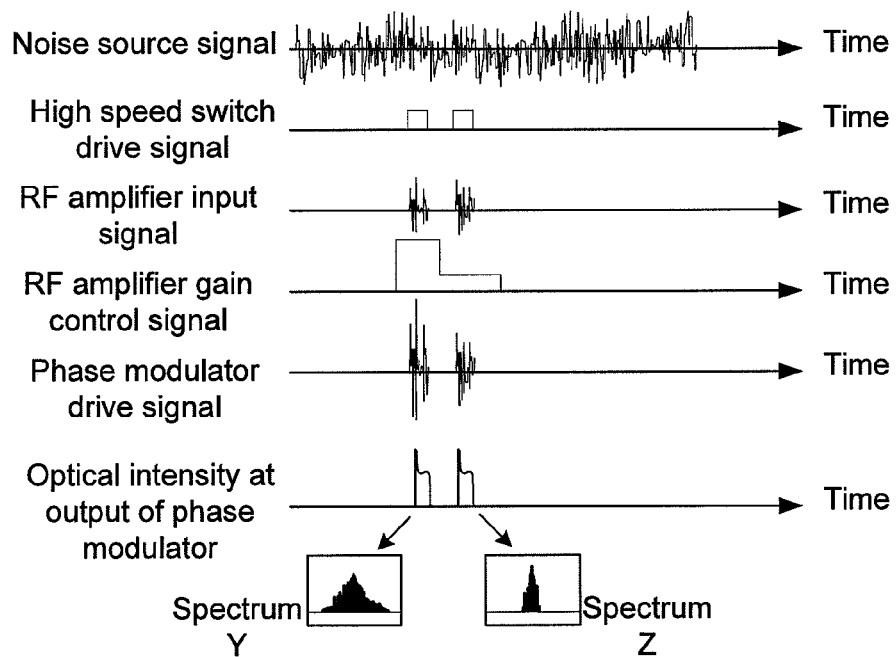
FIG. 13B shows the time variation of the various signals transmitted within the phase modulator driver of FIG. 13A.

Referring to FIG. 13A, there is shown an alternative embodiment of the phase modulation driver 48 where the source module is embodied by a noise source 74 generating a noise signal 76 having a variable frequency and defining a more complex phase variation frequency profile, as for example illustrated in FIG. 2. The corresponding timing diagram is shown at FIG. 13B. This embodiment could be useful for SBS suppression or for applications where a broad (or "white") optical spectrum is desirable, for example in some spectroscopic remote sensing applications where one or several chemical species are to be detected in a given spectral bandwidth, each specie having its own set of spectral absorption bands. Depending upon the application, more different phase modulator driver architectures can be employed in order to generate different RF spectra, for example by combining several oscillators and/or several RF amplifiers, without departing from the scope of the present invention. Examples of such architectures are presented in FIGS. 15A to 15C.

Figure 14A:
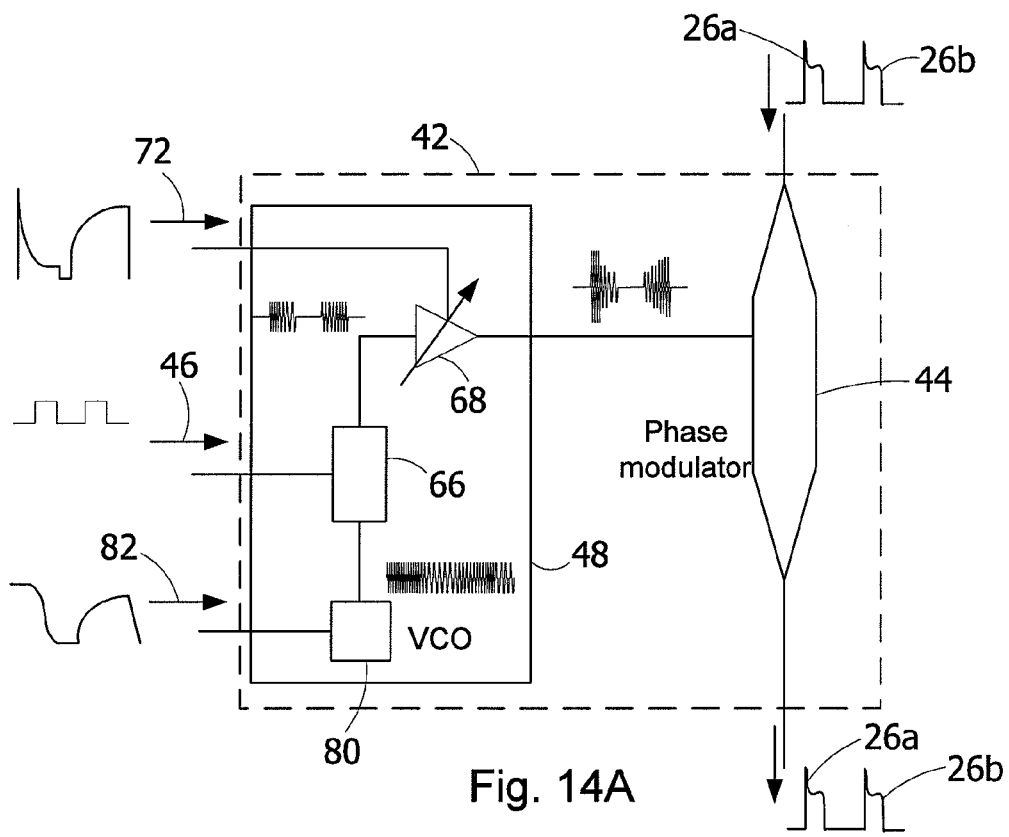
FIG. 14A is a schematized representation of a phase modulator driver according to another embodiment of the invention.

FIG. 14A illustrates an alternative embodiment that can also provide optical pulses with spectral characteristics that vary along the pulses. In this embodiment, source module is embodied by a voltage-controlled oscillator (VCO) 80. A VCO 80 is a single frequency oscillator whose frequency can be controlled with a voltage over a certain range. An example of VCO is the model ZX95-1200W+ (trademark) from Mini-Circuits of Brooklyn, N.Y. In the embodiment of FIG. 14A, the VCO frequency is controlled with a tailored control signal 82, in synchronization with the optical pulses. In addition, the RF amplifier gain is controlled as in FIG. 12A. Using this configuration, both the frequency and the amplitude of the phase variation can be tailored along each pulse.

Figure 14B:
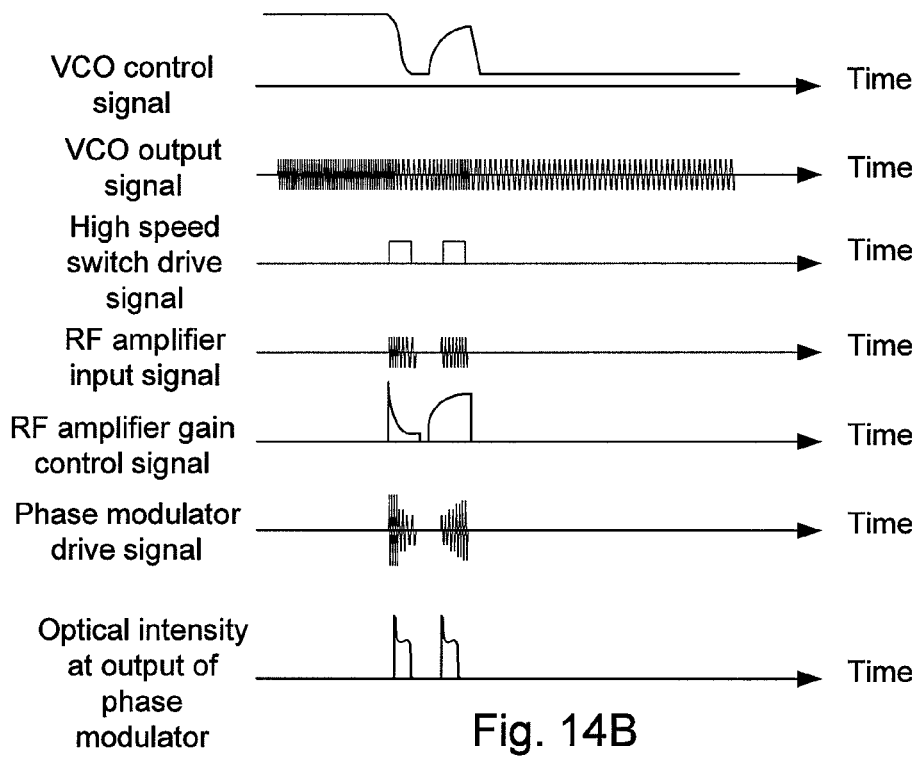
FIG. 14B shows the time variation of the various signals transmitted within the phase modulator driver of FIG. 14A.

Therefore the spectral envelope bandwidth as well as the number of spectral lines and their relative amplitudes can all be controlled and varied along any given optical pulse, thus providing a lot of flexibility in both the time and the spectral domains. The timing diagram for this embodiment is shown in FIG. 14B.

Figure 15A:
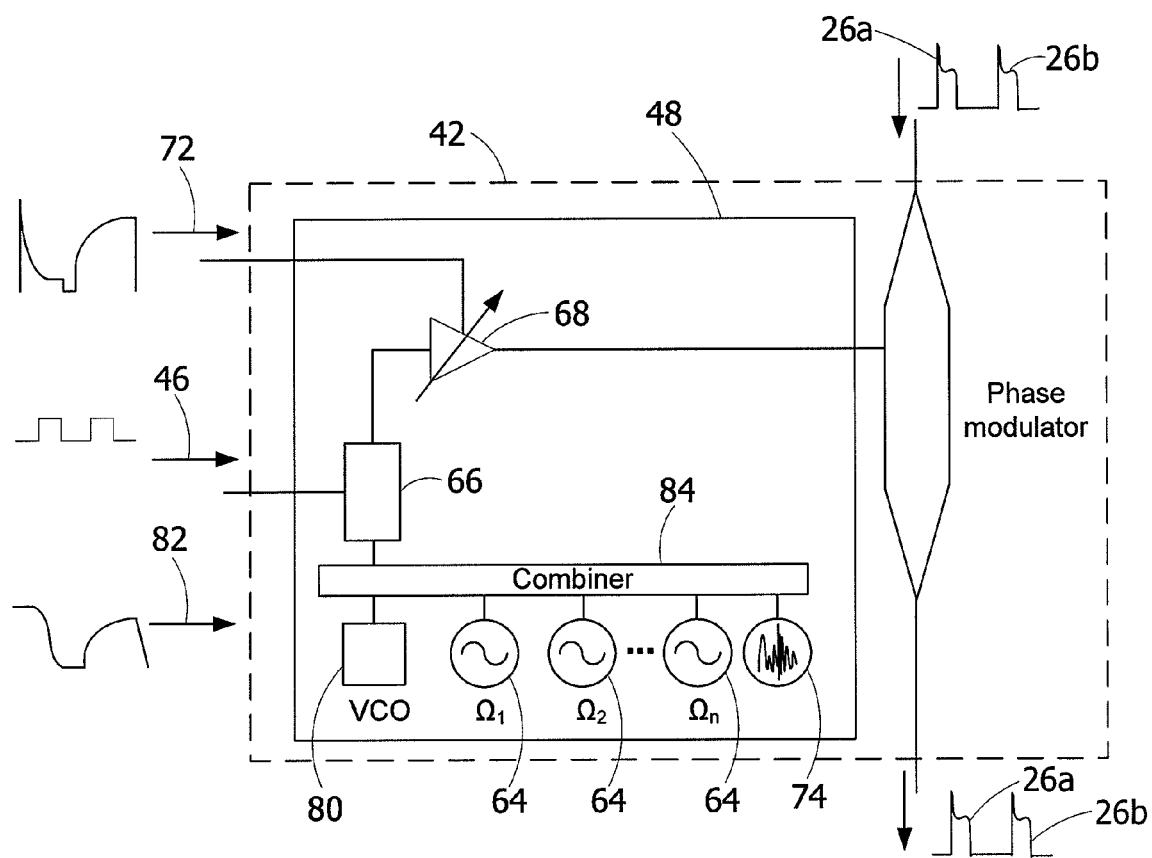
FIG. 15A to 15C are schematized representations of phase modulator drivers using a plurality of source elements according to embodiments of the invention.
Figure 15B:
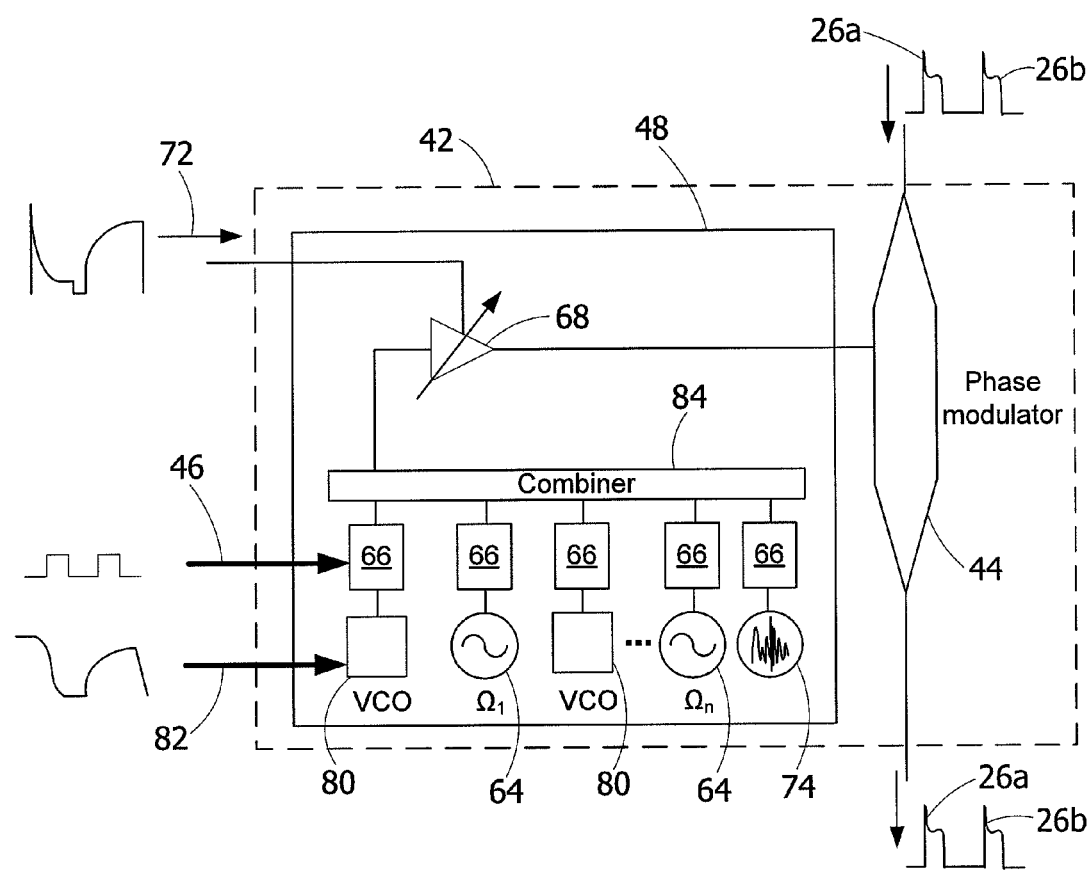
Figure 15C:
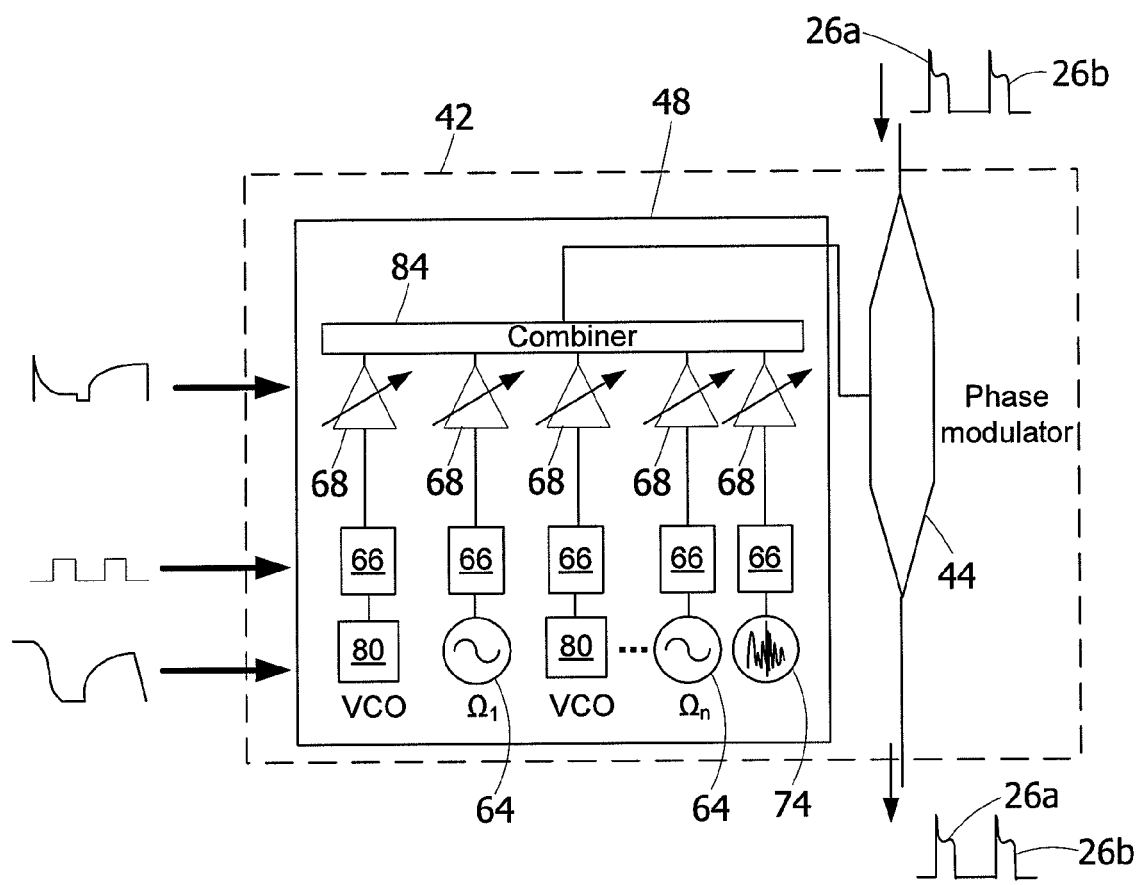

FIGS. 15A to 15C show alternative embodiments where the source module includes a plurality of source elements such as oscillators 64, having one or possibly different frequencies, VCOs 80 and noise sources 74. Each source element generates a corresponding source signal component. Of course, any appropriate number of source elements may be provided, in any appropriate combination depending on the desired end result. A combiner 84 is preferably provided to combine the source signal components from each source element into the source signal. In the embodiment of FIG. 15A, the combiner positioned directly downstream the source elements, therefore combining their output before the switching module. In the embodiment of FIG. 15B, the switching module includes a plurality of high speed switches, each associated with a corresponding source element, and the combiner is provided between the switching module and the gain amplifying module. Finally, the embodiment of FIG. 15C shows a variant where the gain amplifying module also includes individual gain amplifiers in series with a corresponding source element and high speed switch chain, the combiner being provided downstream the gain amplifying module. Such embodiments and variants thereof enable an even more sophisticated pulse spectrum tailoring capability.

Figure 16A:
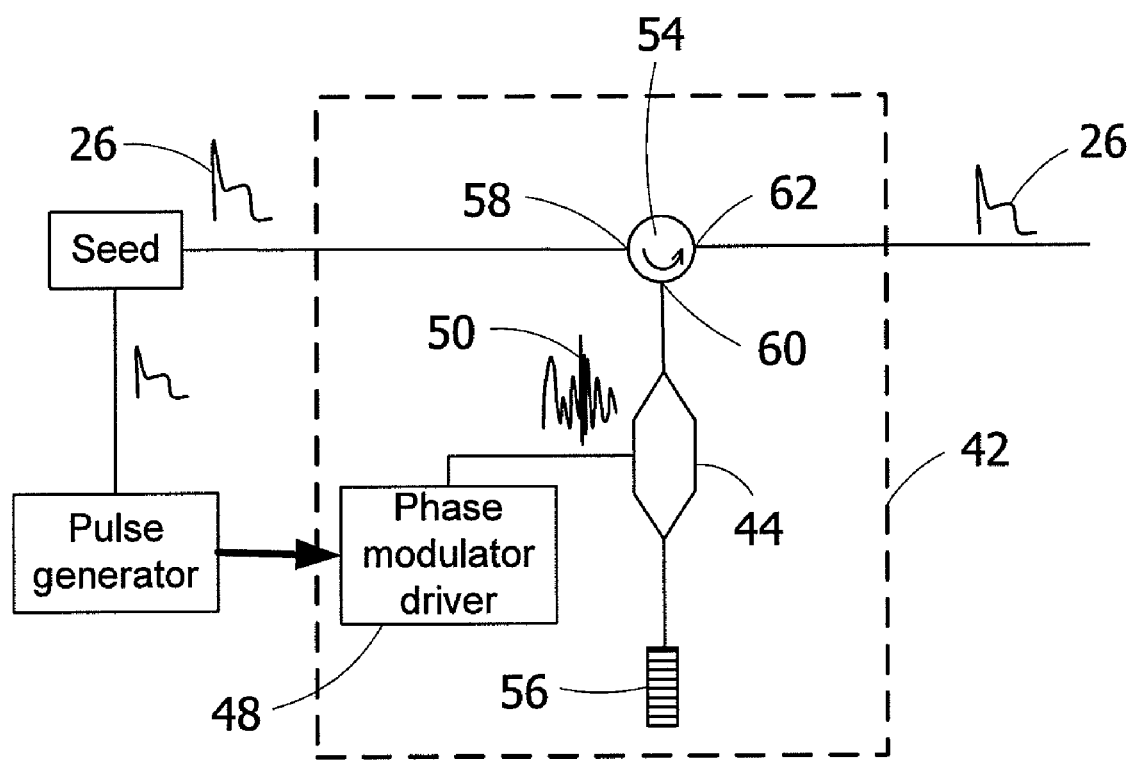
FIG. 16A is a schematic representation of a laser oscillator according to an embodiment of the invention, using a double-pass configuration.
Figure 16B:
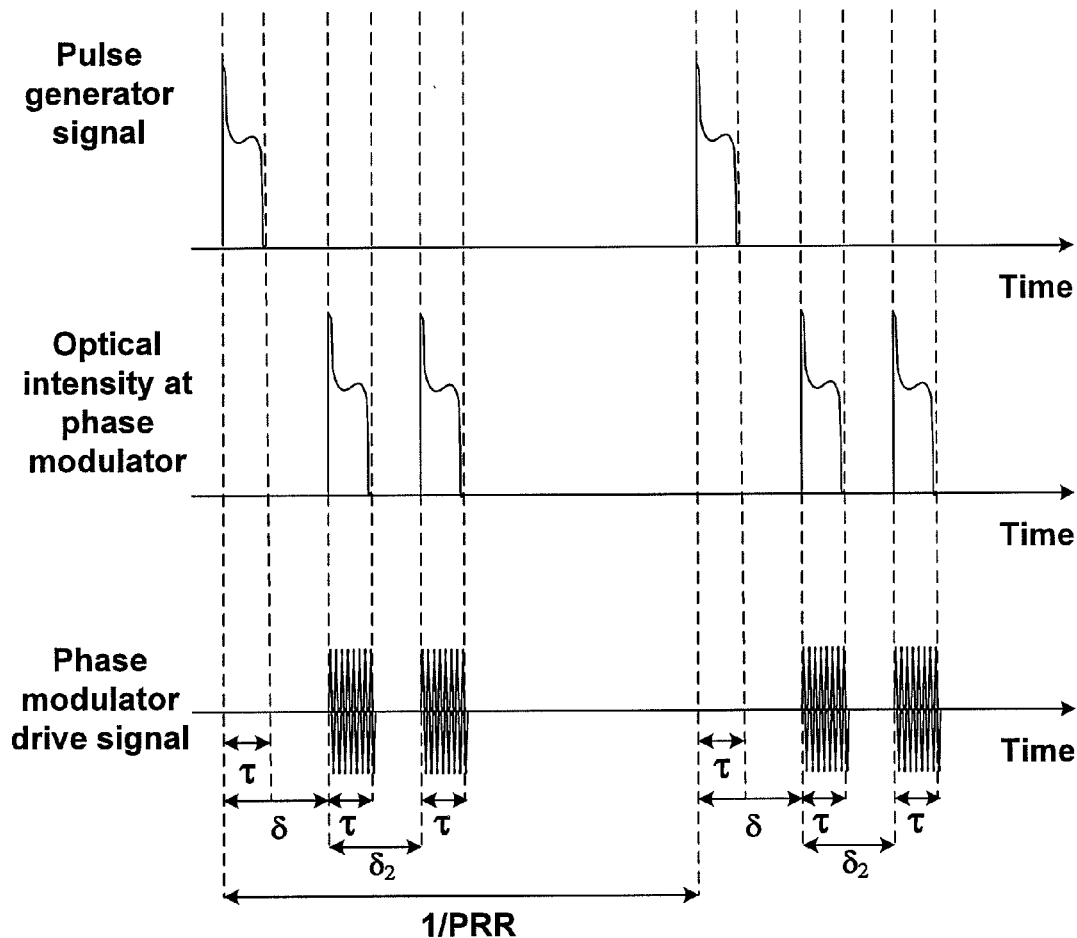
FIG. 16B is a timing diagram for the embodiment of FIG. 16A.

Referring to FIG. 16A, there is shown another embodiment of the invention configured to allow the optical pulses 26 to be phase modulated twice or more. In one such embodiment, the spectrum tailoring module 42 includes a recirculation assembly recirculating the optical pulses 26 through the phase modulator 44 for a plurality of passes. In the illustrated variant, a circulator 54 and a reflective element 56 are used for this purpose. The optical pulses 26 impinge on a first port 58 of the circulator and exit the same through a second port 60 in communication with the phase modulator 44. A first pass of the optical pulses 26 through the phase modulator 44 tailors their spectral profile a first time. The tailored optical pulses are then reflected by the reflective element 56, for example a fiber Bragg grating, located downstream the phase modulator 44 and connected to its output. The reflected pulses 26 then traverse the phase modulator 44 for a second time where their spectral profile is further tailored, re-enter the second port 60 of the circulator 54 and are finally outputted at a third port 62 of the circulator 54. The phase variation drive signal 50 is synchronized with the optical pulses 26 so that the phase modulator 44 is active only while an optical pulse is transmitted through the phase modulator 44 in either direction. FIG. 16B shows an example of corresponding timing diagram.

Figure 17:
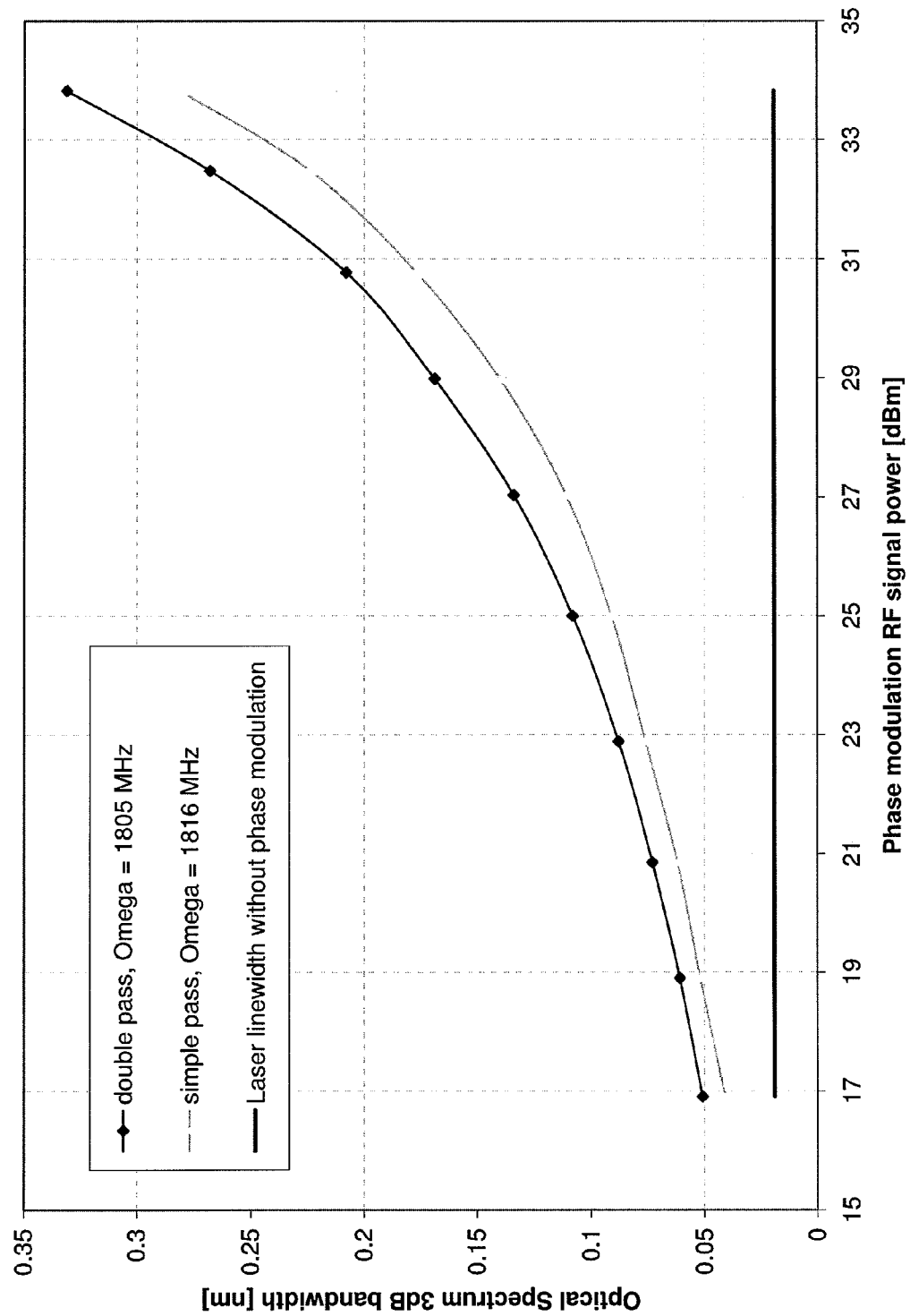
FIG. 17 is a graph showing the experimental comparison of spectral broadening obtained using a single pass vs a double pass configuration.

Advantageously, the embodiment of FIG. 16A provides in principle a twofold increase of the spectral broadening factor with respect to single-pass schemes for the same phase variation condition. Alternatively, while achieving the same spectral broadening factor with the same phase modulation frequency, a 3 dB reduction in the RF average power required to drive the phase modulator is possible in principle. In practice, the achievable improvement is dependent upon the phase modulator design, the optical path length and other practical limitations. For example, phase shifts occurring during the pulse propagation must be compensated. This can be done by a fine tuning of the phase modulation frequency. FIG. 17 presents experimental results comparing the double pass scheme with respect to the single pass configuration. Although not as important as the theoretically predicted value because of the experimental setup limitations, some improvement in the RF power budget was obtained.

Figure 18:
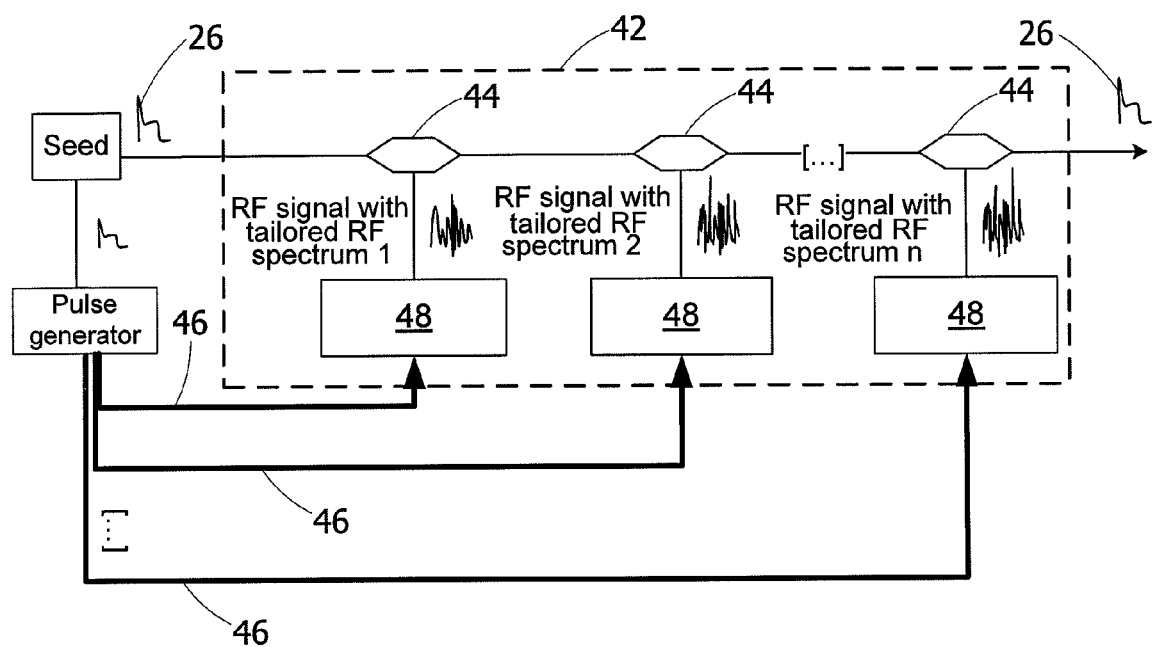
FIG. 18 is a schematic representation of a laser oscillator according to an embodiment of the invention, using a plurality of phase modulators with associated drivers and synchronization means.
Figure 19:
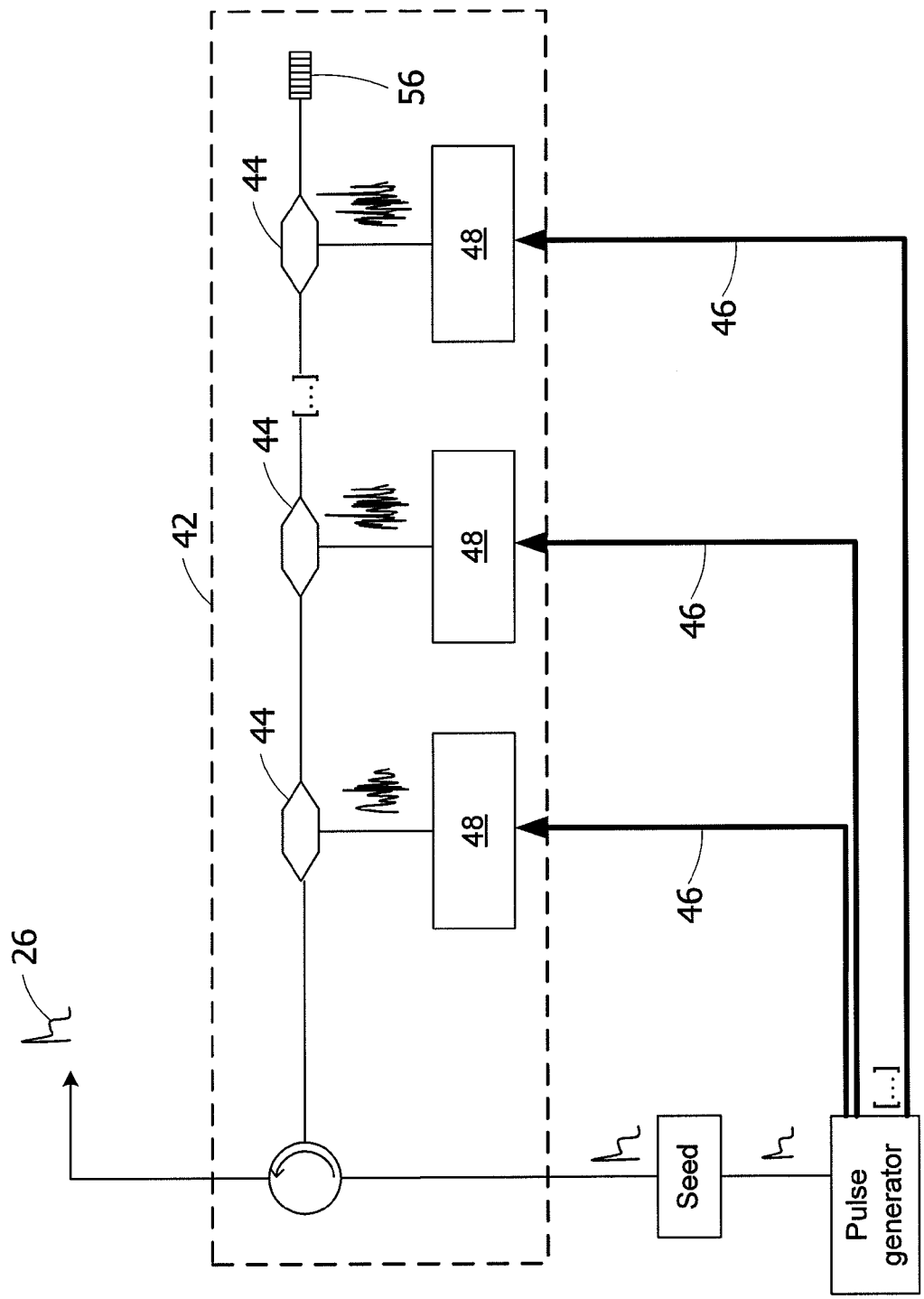
FIG. 19 is a schematic representation of a laser oscillator according to an embodiment of the invention, using a plurality of phase modulators with associated drivers and synchronization means, in a double-pass configuration.

Many variations to the double pass embodiment described above can be implemented without departing from the scope of the invention, such a multiple passes (two or more) in the same phase modulation device, the use of more than one phase modulator, or combinations thereof. With reference to FIG. 18, there is shown an embodiment where a plurality of phase modulators 44 are provided in series, each having an associated phase modulator driver 48. A pulse synchronization signal is transmitted to each phase modulator driver, taking into account the appropriate propagation delays. Each phase modulator may impose a same time-dependent phase variation on the light therethrough, or different phase variation components may be combined to obtain the desired phase at the output of the spectrum tailoring module 42. FIG. 19 shows an alternative embodiment combining some of the features of the embodiments of FIGS. 16A and 18, providing a reflective element 56 and the end of a cascade of phase modulators 44 so that the optical pulses 26 are modulated by each phase modulator twice.

Pulse Generating Method

In accordance with another aspect of the invention, there is provided a method for providing high power optical pulses while avoiding the onset of non-linear effects.

The expression "high power" optical pulses is understood to refer to pulses having a peak power which is sufficient for typical material processing and sensing applications as explained above. Typically, a pulse energy of at least 50 µJ is considered "high power", although this value is given as a general indication and is not considered limitative to the scope of the invention. For example, the methods taught can also be applied to limit the onset and the impact of SBS and SPM in low average power fiber oscillators comprising single mode fibers with mode field diameters of a few microns. As a matter of fact, the methods can be applied as soon as the intensity of the pulses in the fiber core reaches the non linear effects intensity threshold, independent of the fiber mode field diameter.

The method first includes generating seed optical pulses, for example with a light generating assembly according to one of the embodiments described above or equivalents thereof. The spectral profile of these seed pulses is then broadened by propagation through at least one phase modulator imposing a time-dependent phase variation on each of these seed pulses. As explained above, the phase modulator is activated in synchronization with the seed optical pulses therethrough. Once spectrally broadened, the optical pulses are amplified, thereby obtaining the high power optical pulses. It will be understood that any of the above described embodiments of the oscillator or equivalents thereof may be used to realize the method generally described herein.

Stimulated Brillouin Scattering (SBS) Mitigation

Embodiments of the method described above may provide a powerful tool for overcoming the SBS limitations affecting other narrow linewidth, high power fiber lasers while not sacrificing the beam quality, the flexibility, the stability and the reliability of the lasers. The SBS suppression efficiency provided by phase modulation in the field of high power pulsed fiber lasers is dependent upon two main factors. The first one is the maximum achievable spectral broadening, which is governed by the frequency spectrum of the phase variation and by the peak phase deviation. The second one is the phase modulation dynamics with respect to the SBS dynamics in the context of pulses having durations of the same order of magnitude than the lifetime of the SBS phonon.

Figure 20:
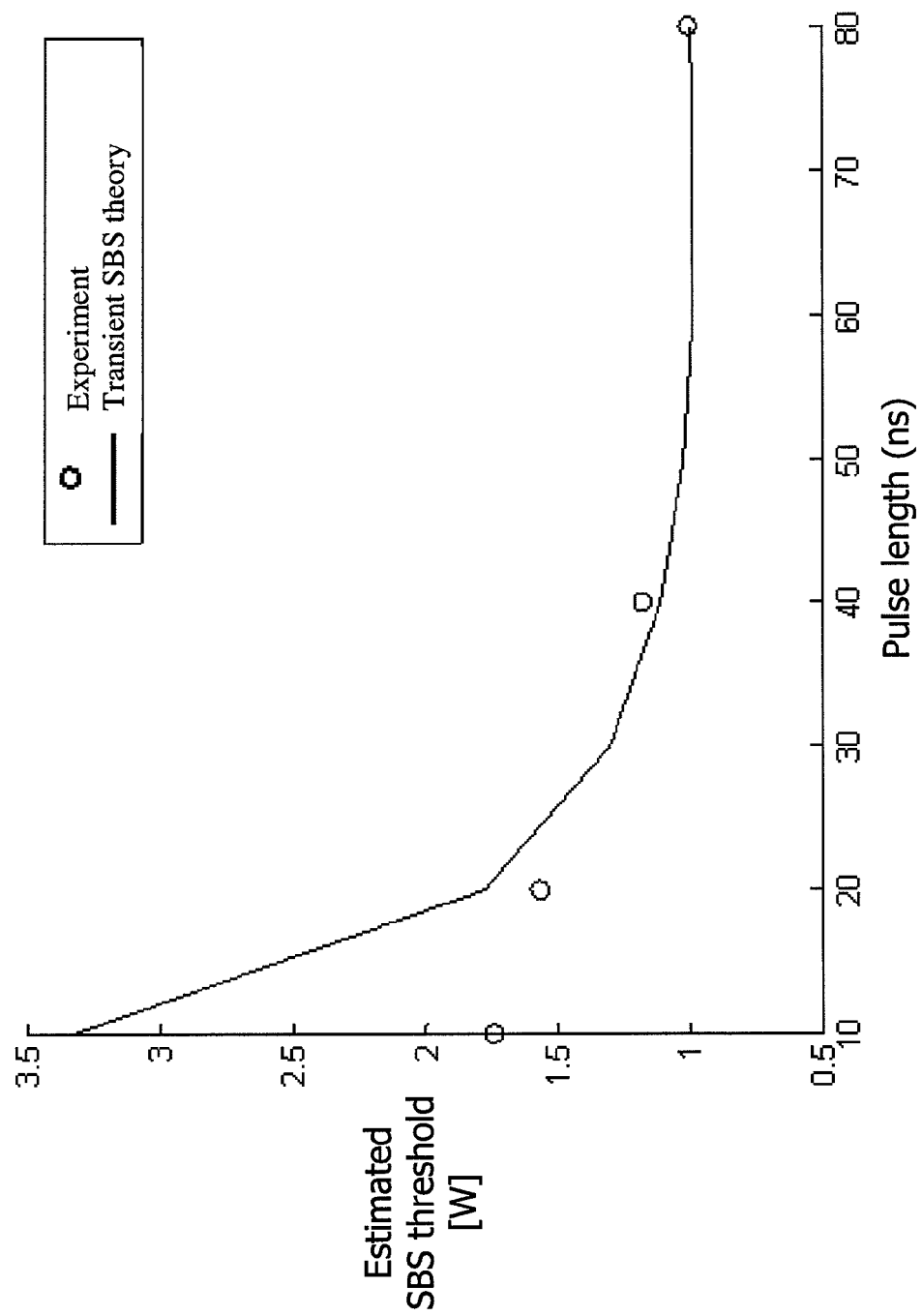
FIG. 20 is a graph showing the SBS threshold dependence on the pulse duration.
Figure 21:
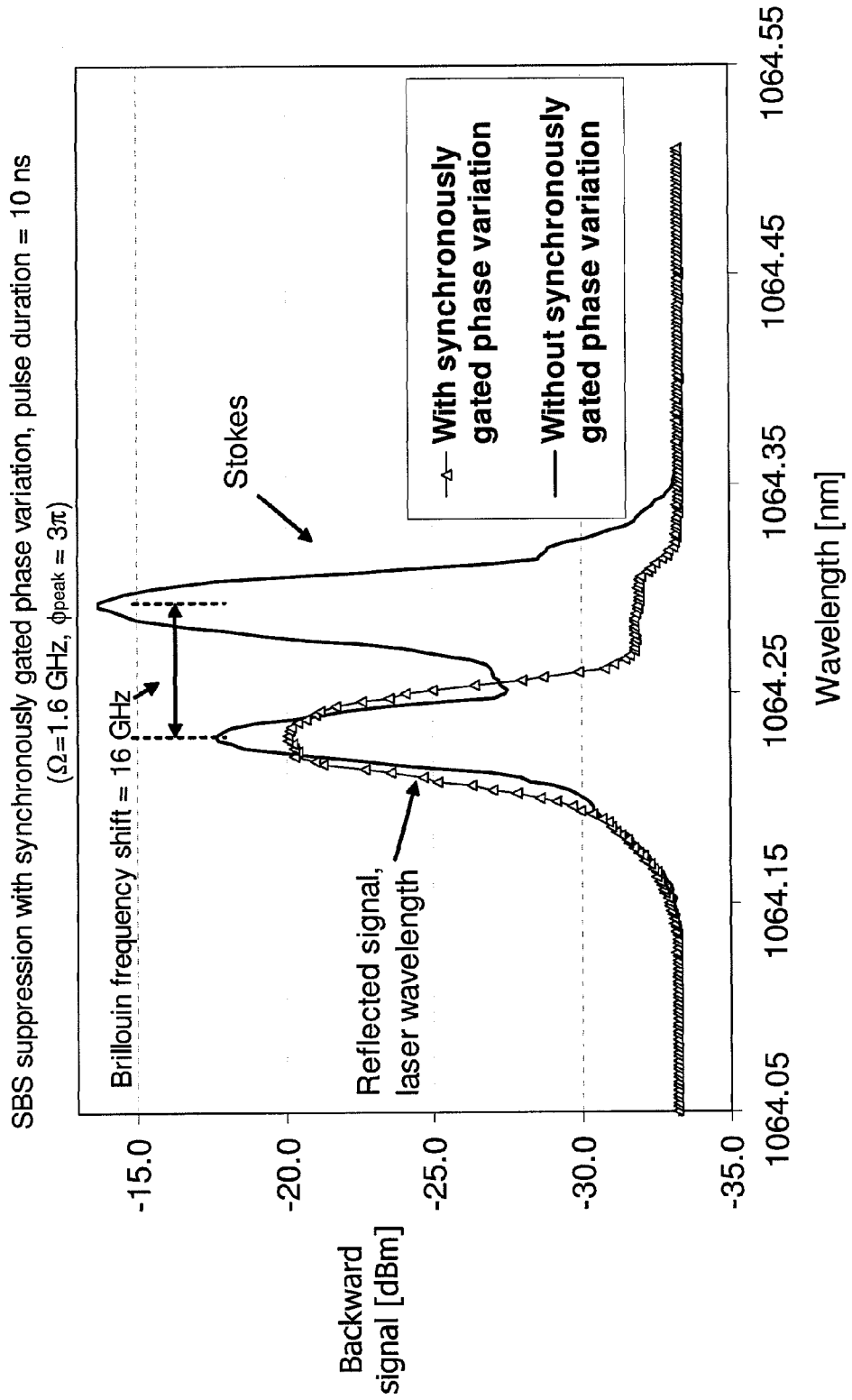
FIG. 21 is a graph of experimental result showing SBS suppression for a pulsed fiber laser.

For the spectral broadening aspect, it is well-known in the art that the SBS gain is reduced by a factor $1+\Delta v_{signal}/\Delta v_B$ that depends on the ratio of the signal linewidth $\Delta v_{signal}$ to the Brillouin-gain bandwidth $\Delta v_B$ with respect to the maximum Brillouin gain obtained for a very narrow linewidth signal (see for example Cotter, D. "*Stimulated Brillouin Scattering in Monomode Optical Fiber*", J. Opt. Commun. 4 (1983) 1, 10-19). Typically, $\Delta v_B$ is of the order of 50-100 MHz in optical fibers at a wavelength of 1 μm. For the dynamical aspect, the SBS threshold is generally dependent upon the relative values of the pulse duration and of the phonon lifetime, as predicted by transient SBS models (see Boyd, R. W., "*Nonlinear Optics*", Academic Press, 2003, pp. 427-428) FIG. 20 shows experimental results demonstrating that the SBS threshold varies with the pulse duration. SBS can be suppressed using a synchronously gated, time-dependent phase variation through the broadening of the spectral profile of the optical pulses. However for a given linewidth $\Delta v_{signal}$ obtained with phase variation at a frequency $\Omega$, a duration $1/\Omega$ is required to sweep the complete optical frequency span. For durations shorter than $1/\Omega$ the average linewidth is therefore smaller than $\Delta v_{signal}$. For CW lasers, efficient SBS suppression requires that $1/\Omega < T_{phonon}$, where $T_{phonon}$ is the phonon lifetime. A typical value for $T_{phonon}$ is 15 ns. Therefore for CW lasers $\Omega > 66$ MHz is required. For pulsed lasers, the constraint $\Omega >> 1/\tau$, where $\tau$ is the pulse duration, should be additionally satisfied to avoid issues such as pulse to pulse variations of the SBS threshold, as discussed above. For example, for a 2 ns pulse duration this constraint translates to $\Omega >> 500$ MHz, and to $\Omega >> 100$ MHz for a 10 ns pulse duration. FIG. 21 shows an example of SBS suppression obtained experimentally for a pulse duration of 10 ns. As can be observed in the figure, the backward propagating Stokes wave intensity is reduced by about two orders of magnitude using a single frequency phase variation with $\Omega=1.6$ GHz and a peak phase deviation of $3\pi$.

Figure 22:
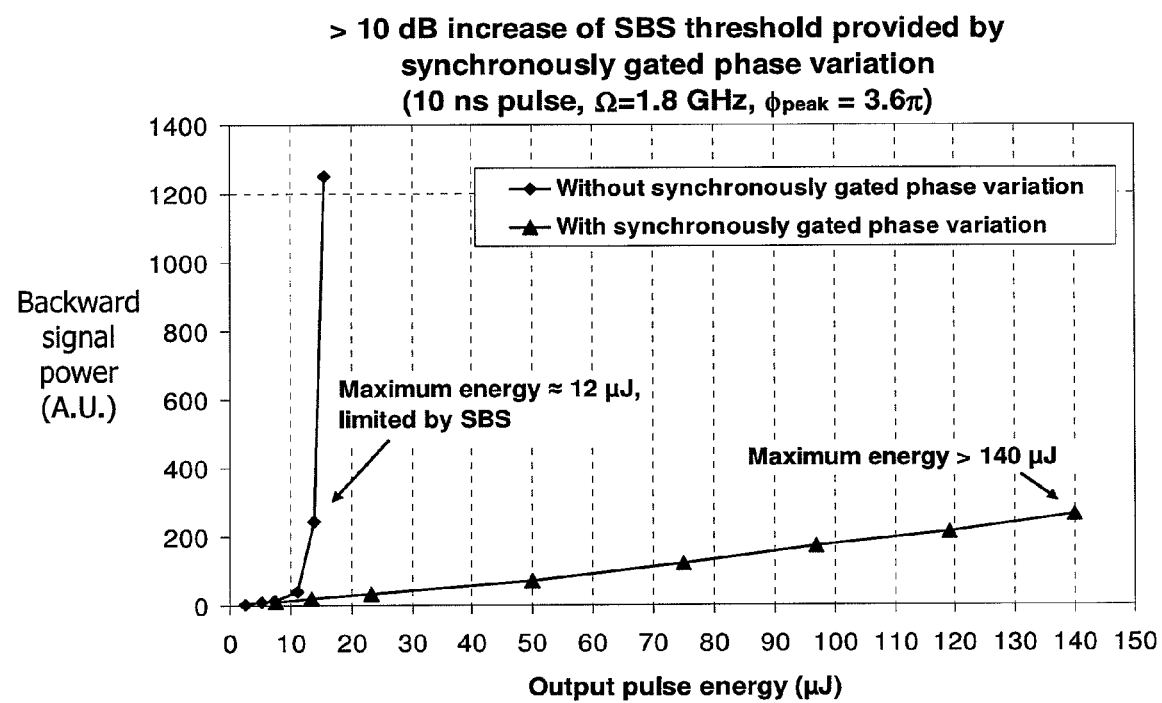
FIG. 22 is a graph of experimental result showing SBS suppression, where the output pulse energy can be increased by a factor of ten at least when using a synchronously gated phase variation scheme.
Figure 23:
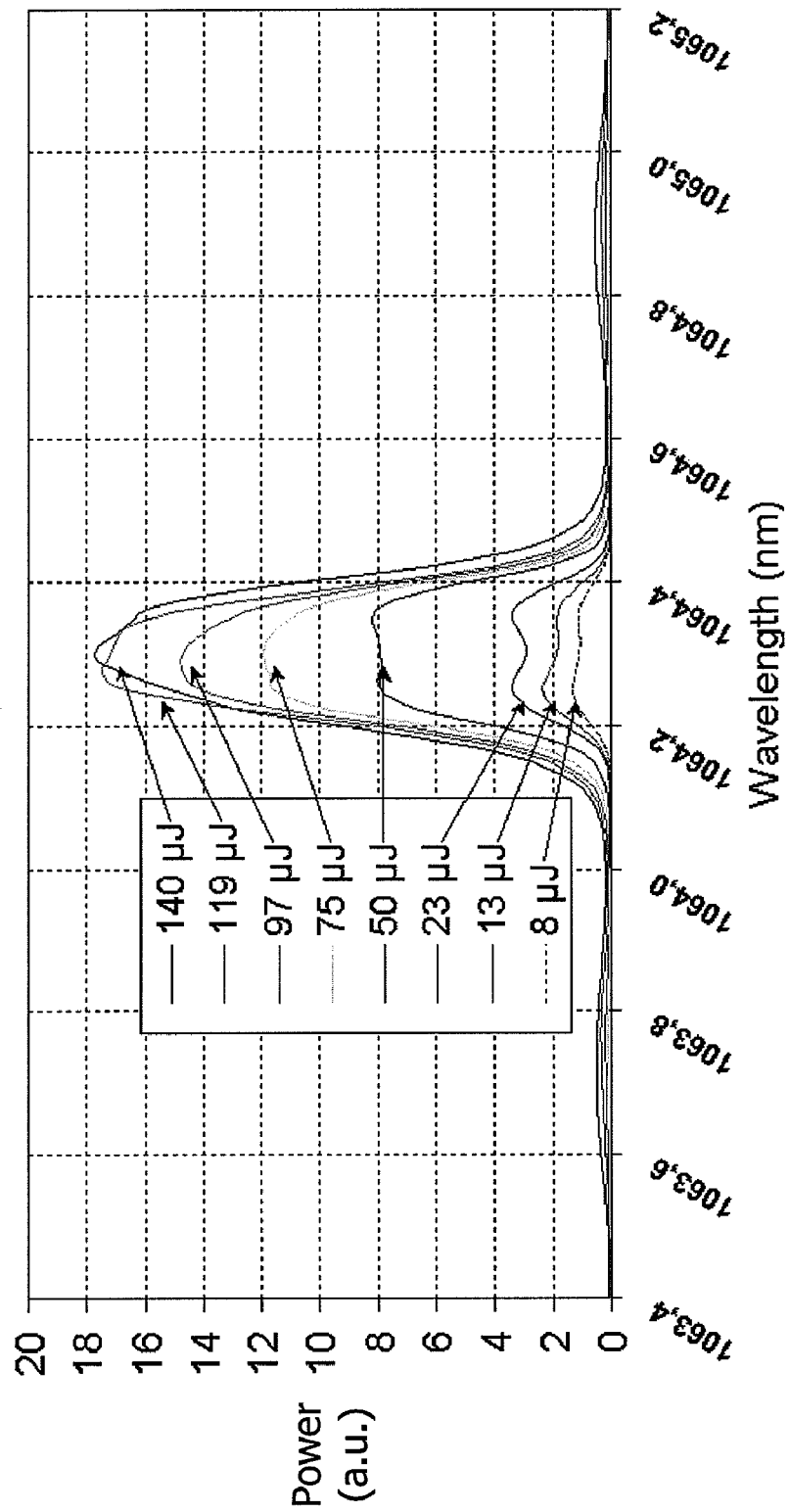
FIG. 23 is a graph of experimental spectra obtained at different output pulse energy levels.
Figure 24:
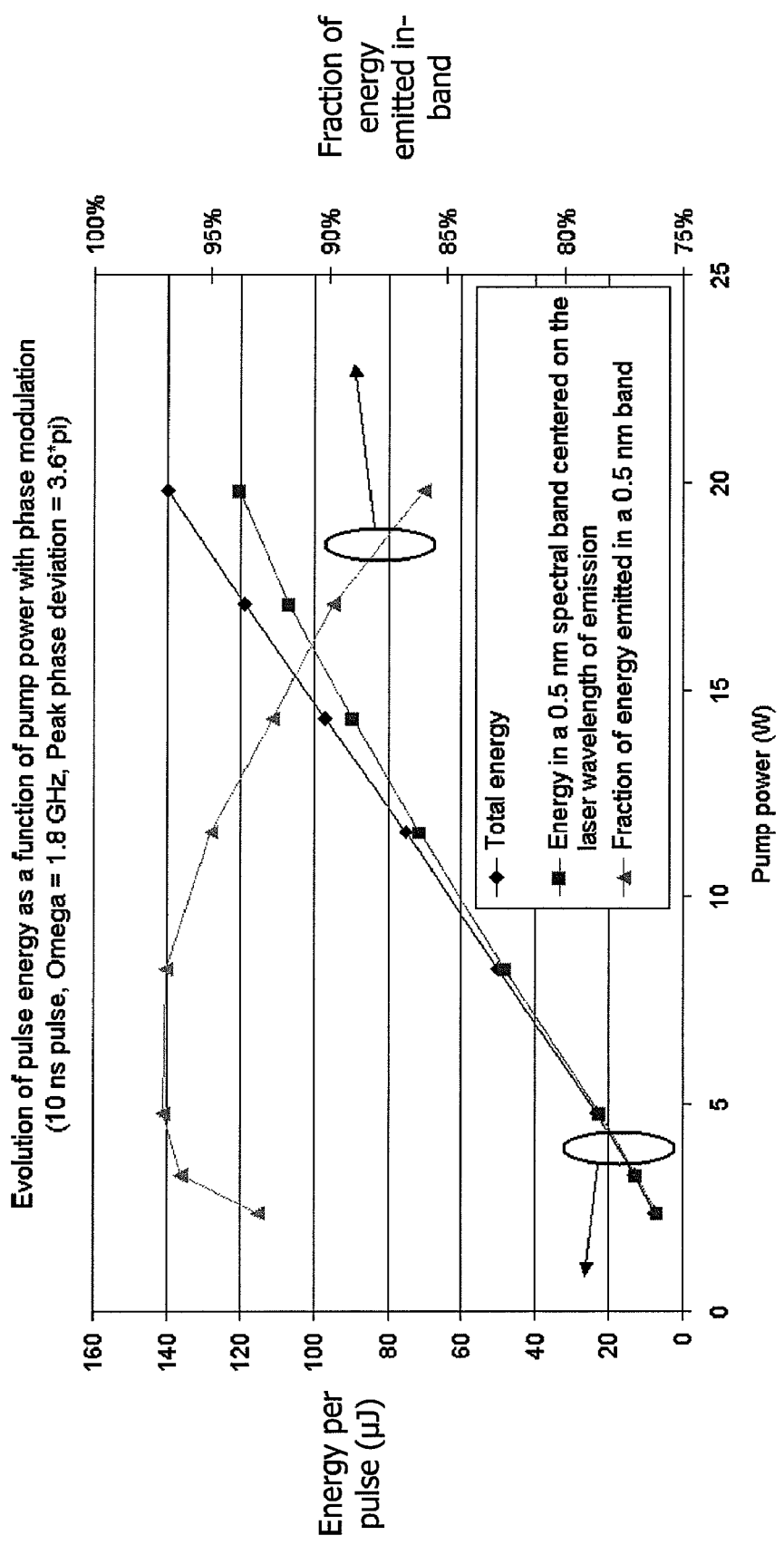
FIG. 24 is a graph of experimental results showing that most of the energy can be maintained in a narrow spectral bandwidth while scaling the output power.

FIG. 22 presents another experimental example of SBS suppression. In this experiment, the LMA fiber amplifier maximum output pulse energy is clearly limited at 12 μJ without a phase variation, as the backward signal intensity increases exponentially beyond this threshold. By applying a synchronously gated, time-dependent phase variation to the seed signal, no such exponential behavior is observed for pulse energy values about ten times higher. Furthermore, the amplified pulse spectral profile remains quite narrow, as can be see in FIG. 23, an important characteristic for applications involving frequency conversion. This is also shown in FIG. 24, where the energy per pulse emitted in a spectral bandwidth of 0.5 nm is plotted against the injected pump power in the LMA fiber pump core. The slight broadening of the spectrum is the result of the onset of SPM, which also means that SBS no longer represents a concern. SPM mitigation is the subject of the next section.

Self-Phase Modulation (SPM) Mitigation

Figure 25A:
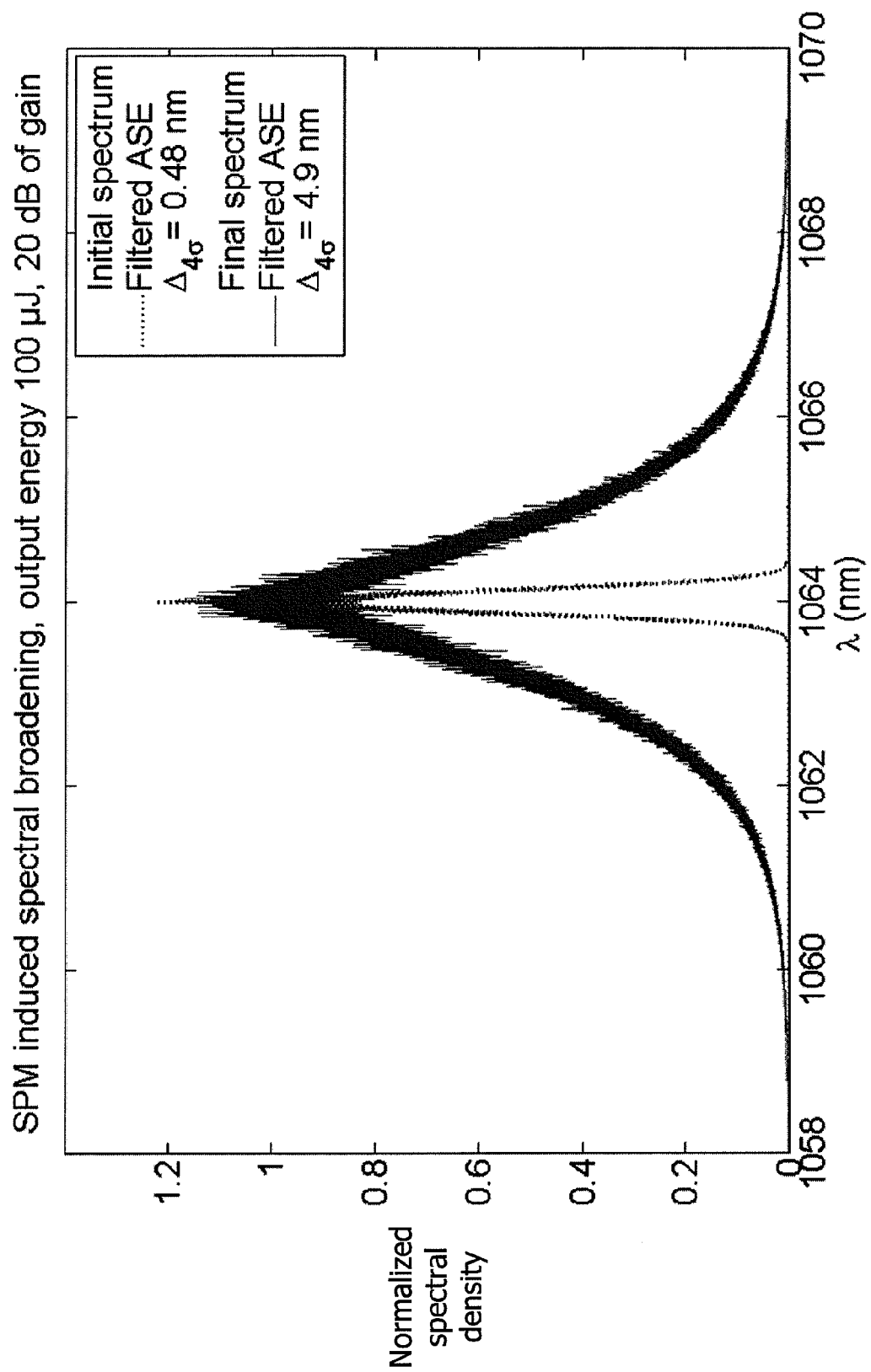
FIG. 25A is a graph of calculated spectra showing an example of the impact of SPM for a seed based on filtered ASE.
Figure 25B:
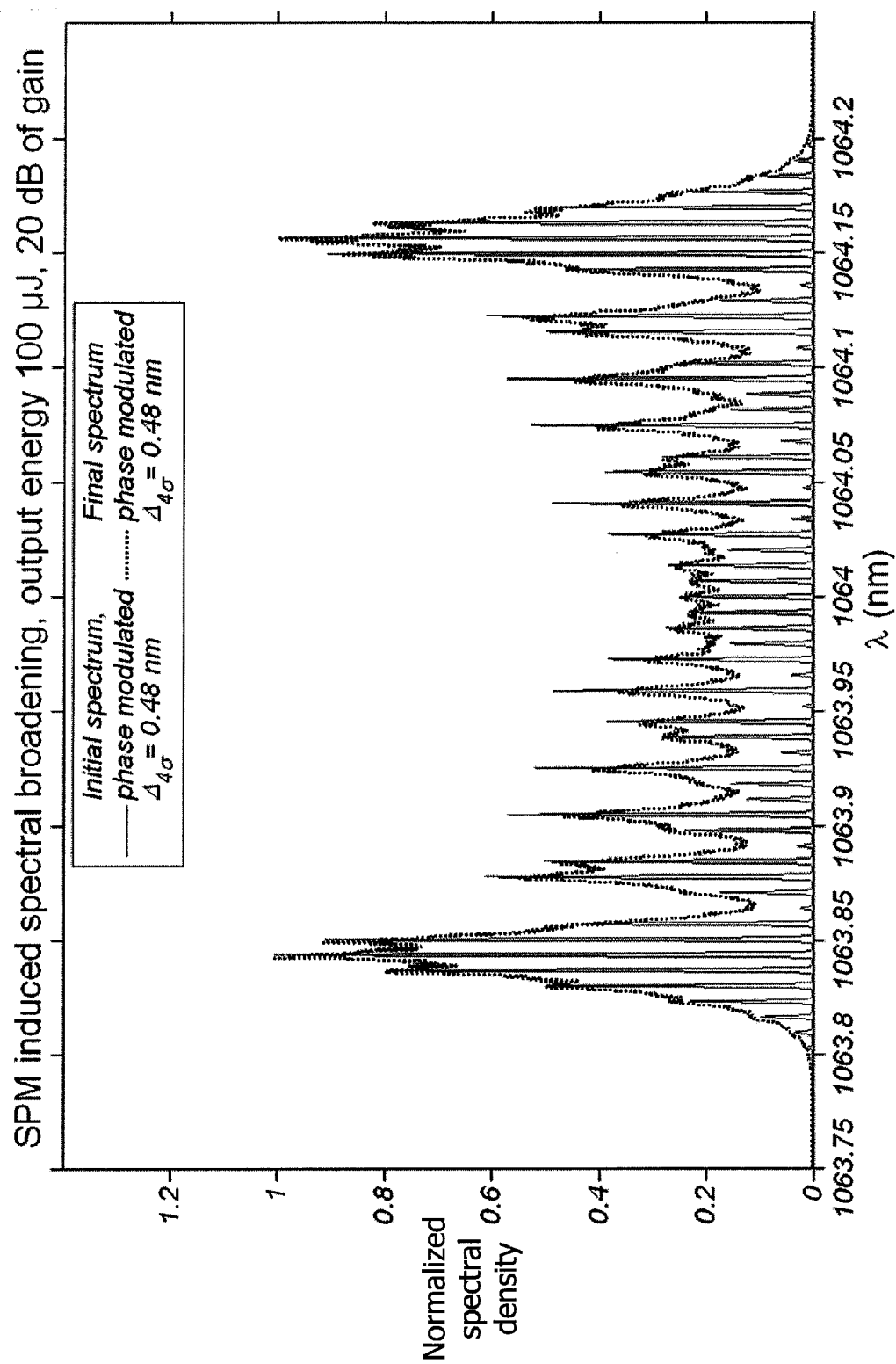
FIG. 25B is a graph of calculated spectra showing an example of the impact of SPM for a seed based on a narrow linewidth laser diode and a synchronously gated phase variation scheme.
Figure 25C:
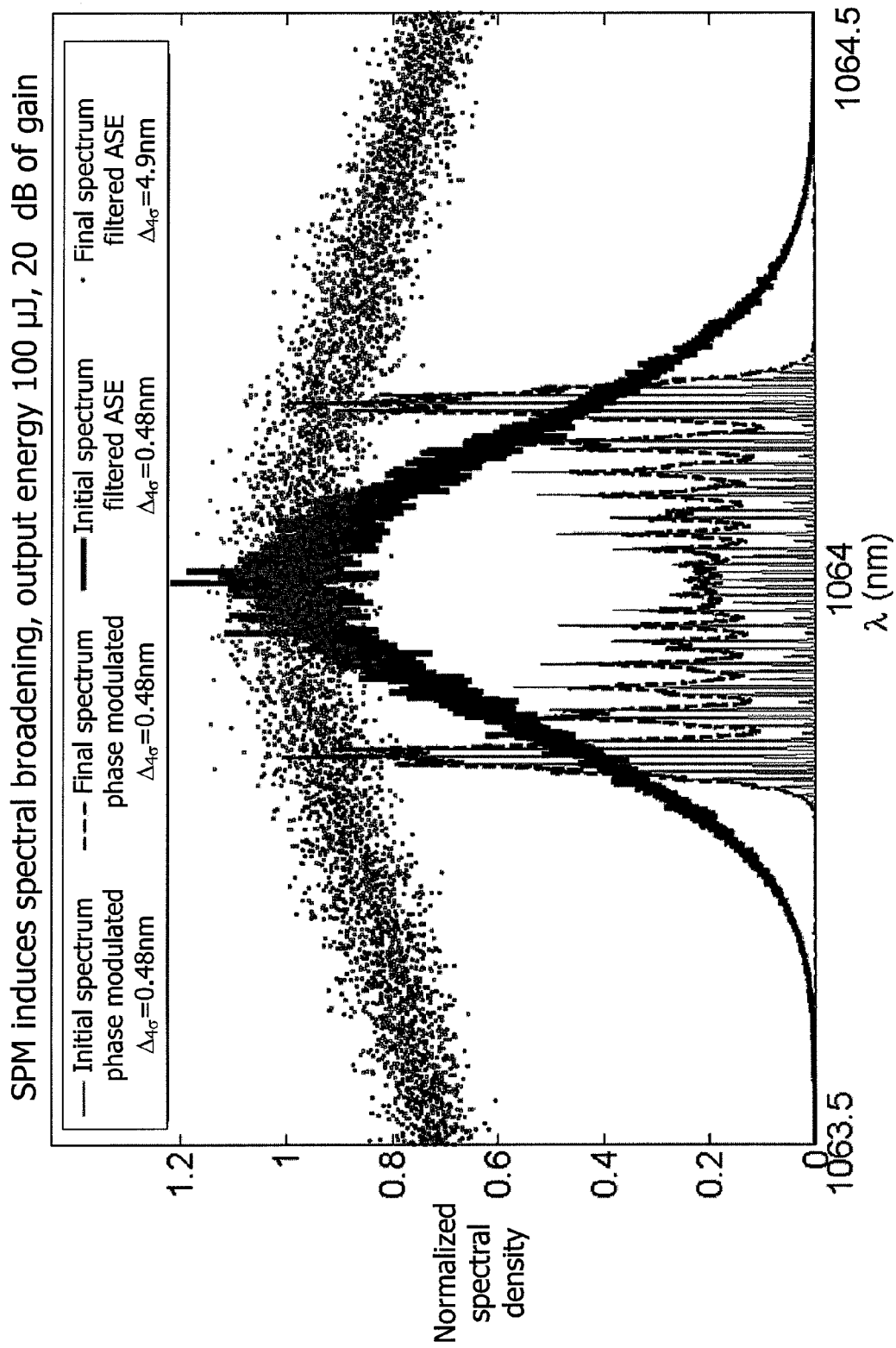
FIG. 25C shows a superposition of the spectra of FIGS. 25A and 25B to compare the impact of SPM for the two associated types of seed sources.

Once SBS is kept under control, SPM is the next nonlinear effect that must be considered for further scaling the output pulse energy of pulsed fiber lasers. The SBS mitigation method must therefore be compatible with efficient SPM mitigation as well. As will be explained below, it turns out that synchronously gated phase variation scheme is very advantageous in terms of SPM control with respect to other spectral broadening approaches employed for SBS mitigation, such as seeds based on filtered fluorescence or using multimode semiconductor laser diodes. This has been verified both experimentally and numerically by the inventors. FIG. 25A shows an example of calculated spectra with broadening caused by SPM for a seed based on filtered ASE, whereas FIG. 25B presents the calculated broadening for a phase-modulated narrow linewidth single longitudinal-mode seed. For the filtered ASE seed, SPM broadens the spectrum considerably, as the final spectral width is about ten times larger than the initial linewidth. For the phase modulated seed, each of the individual spectral lines is slightly broadened by SPM and the energy remains in the initial spectral envelope. FIG. 25C compares the spectra of FIGS. 25A and 25B using the same horizontal scale, to emphasize the different magnitudes of the spectral broadening induced by SPM for both types of seeds. It was also verified numerically that the spectral broadening is comparable to the filtered ASE source case when using a multimode seed laser diode having an initial spectrum structure identical to a phase modulated single mode laser diode. Therefore the spectrum structure is not the dominant factor for SPM, whereas the phase correlations are very important. Clearly, applying a synchronously gated, time-dependent phase variation is really efficient with respect to other approaches for limiting the impact of SPM, which enables high peak power pulses having narrow spectral widths.

Figure 26:
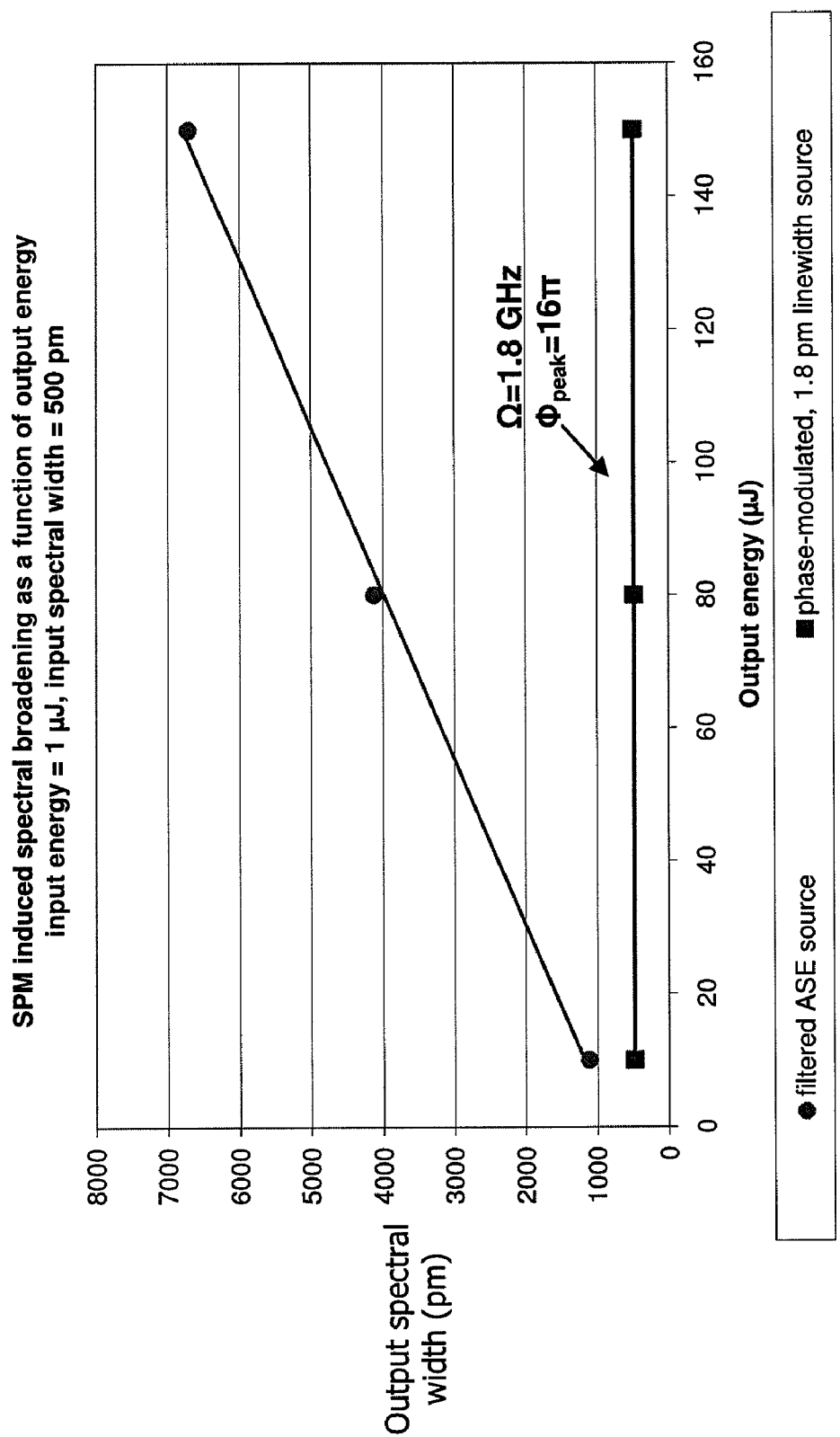
FIG. 26 is a graph comparing the effect of SPM on the spectral linewidth of pulsed fiber lasers as a function of the output energy per pulse for a seed source based on filtered ASE with respect to a seed source based on a narrow linewidth, phase modulated laser.

FIG. 26 shows a typical example of how SPM affects the spectral width of the output pulses as a function of their energy. In this particular case the pulses are amplified in 2.5m of LMA fiber. As the gain is increased in the fiber, so is the spectral width of the pulses in the case of a 500 pm wide filtered ASE source. The same 500 pm wide (width of the envelope) phase modulated source (single peak linewidth of 1.8 pm, $\Omega=1.8$ GHz and $\phi_{peak}=16\pi$) is barely affected by the SPM-induced spectral broadening.

Figure 27:
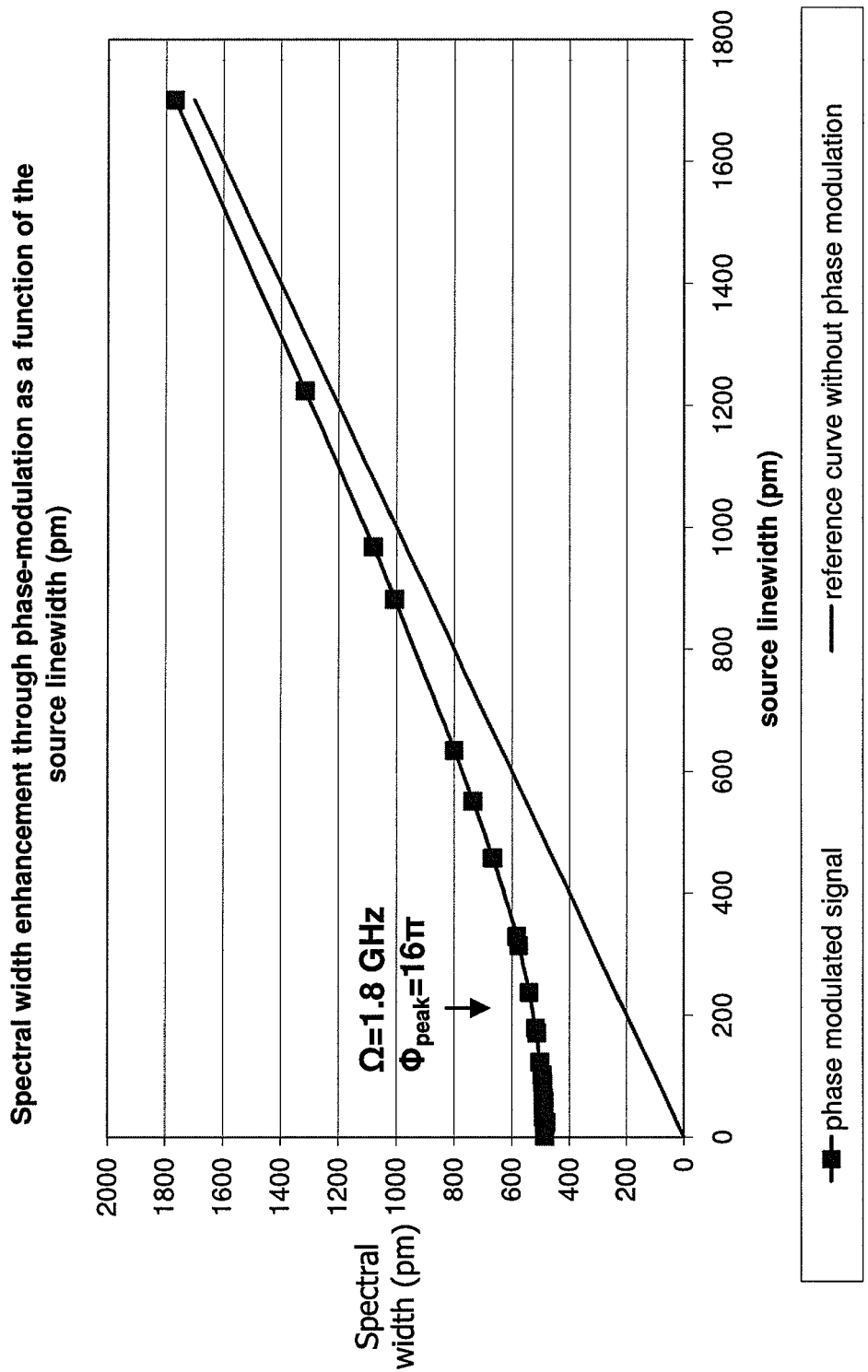
FIG. 27 is an example of spectral width control enhancement provided by a synchronously gated phase variation scheme.

The spectral broadening through SPM can be viewed as a linear function of the output energy. We therefore introduce the parameter $S_{SPM}$ which is a measure of the spectral broadening slope in (pm/μJ). A phase modulated source is characterized by a spectral width, which corresponds to the width of the total envelope, and a single peak linewidth, which is the linewidth of the source before the time-dependent phase variation is applied. FIG. 27 shows the relationship between the spectral width of the envelope and the line width of the source for a particular case of a synchronously gated, sinusoidal phase variation ($\Omega=1.8$ GHz and $\phi_{peak}=16\pi$). It can be seen from FIG. 27 that the minimal spectral width of the envelope with the applied phase variation conditions is 500 pm independently of the source linewidth.

Figure 28:
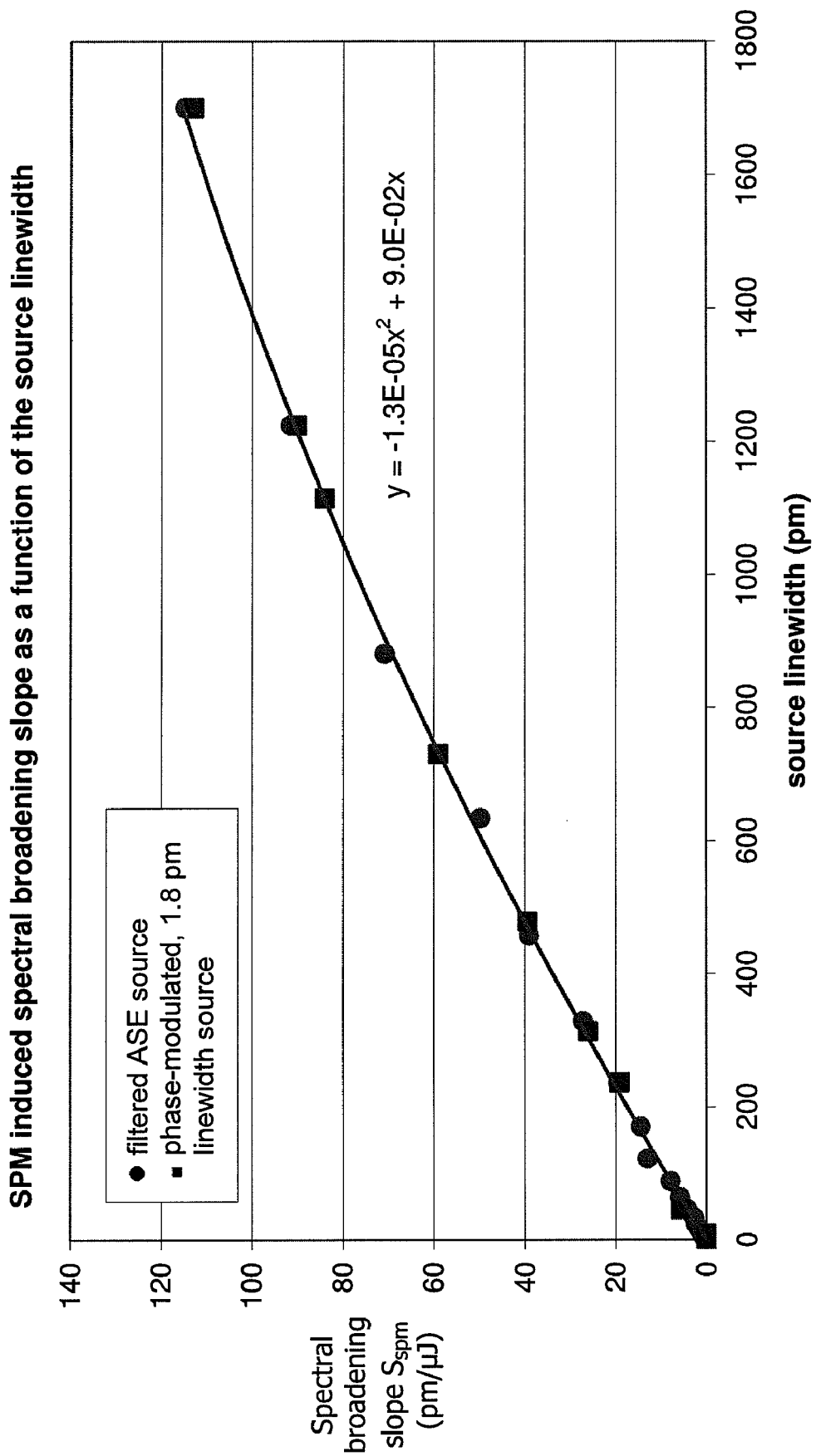
FIG. 28 is an example of SPM-induced spectral broadening slope as a function of the source linewidth.

A numerical comparison of the spectral broadening slope predicted for a filtered ASE source and for a phase modulated filtered ASE source is presented in FIG. 28 as a function of the source linewidth, considering the same length of the same LMA fiber employed to generate the graph of FIG. 26. For the phase modulated ASE source, it is important to notice that the linewidth appearing on the horizontal axis of the graph of FIG. 28 corresponds to the spectral width of the source itself, not the spectral width of the envelope generated by the phase modulation. It is clear from those results that the broader the source is, the more it will be affected by SPM through spectral broadening. Secondly and most importantly, a phase modulated source can have a significantly broader initial spectral width (see FIG. 27) than its source linewidth for efficiently suppressing SBS while still exhibiting a spectral broadening slope as low as it is in the absence of phase modulation. For example and with respect to the conditions prevailing for FIGS. 26 and 28, if one chose a filtered ASE source having an emission bandwidth of 500 pm as a seed source in order to suppress SBS, then the spectral broadening slope $S_{spm}$ due to SPM is of the order of 40 pm/µJ, as can be seen in FIG. 28. As shown in FIG. 26, this yields a spectral linewidth larger than 2.5 nm for optical pulses having an output energy of 50 µJ, which is clearly detrimental for frequency conversion in non-linear crystals (most nonlinear crystals have spectral acceptance bandwidth smaller than 1 nm). On the other hand, if for the same SBS suppression purpose one chooses a very narrow linewidth source (e.g. 1.8 pm as in FIG. 28) and apply a synchronously gated phase variation so as to produce an envelope having a spectral bandwidth of 500 pm as shown in FIG. 27, then the spectral broadening slope remains close to zero (FIG. 28) and the spectral bandwidth of the amplified optical pulses remains of the order of 500 pm for output energy levels as high as 150 µJ, as shown in FIG. 26. Clearly, the second option is superior to the first one as it yields optical pulses with high energy levels and narrow spectral linewidths simultaneously.

In view of those results, one skilled in the art will appreciate that some embodiments of the present invention can efficiently scale the peak power of high power pulsed fiber lasers and mitigate both SBS and SPM.

In some embodiments, it may be advantageous to choose a seed source having a linewidth that is as narrow as possible, such as a very coherent single longitudinal mode semiconductor laser diode. It may also be advantageous to use the phase modulation techniques disclosed with respect to embodiments of the present invention to add optical frequencies so as to broaden the spectral envelope of the seed by a factor that is just sufficient to suppress SBS.

By choosing a very narrow linewidth seed, the impact of SPM is minimized once SBS is suppressed by the phase modulation because the spectral broadening slope due to SPM, which increases with the initial source linewidth as shown in FIG. 28, is minimized.

Spectroscopic Applications

Figure 29:
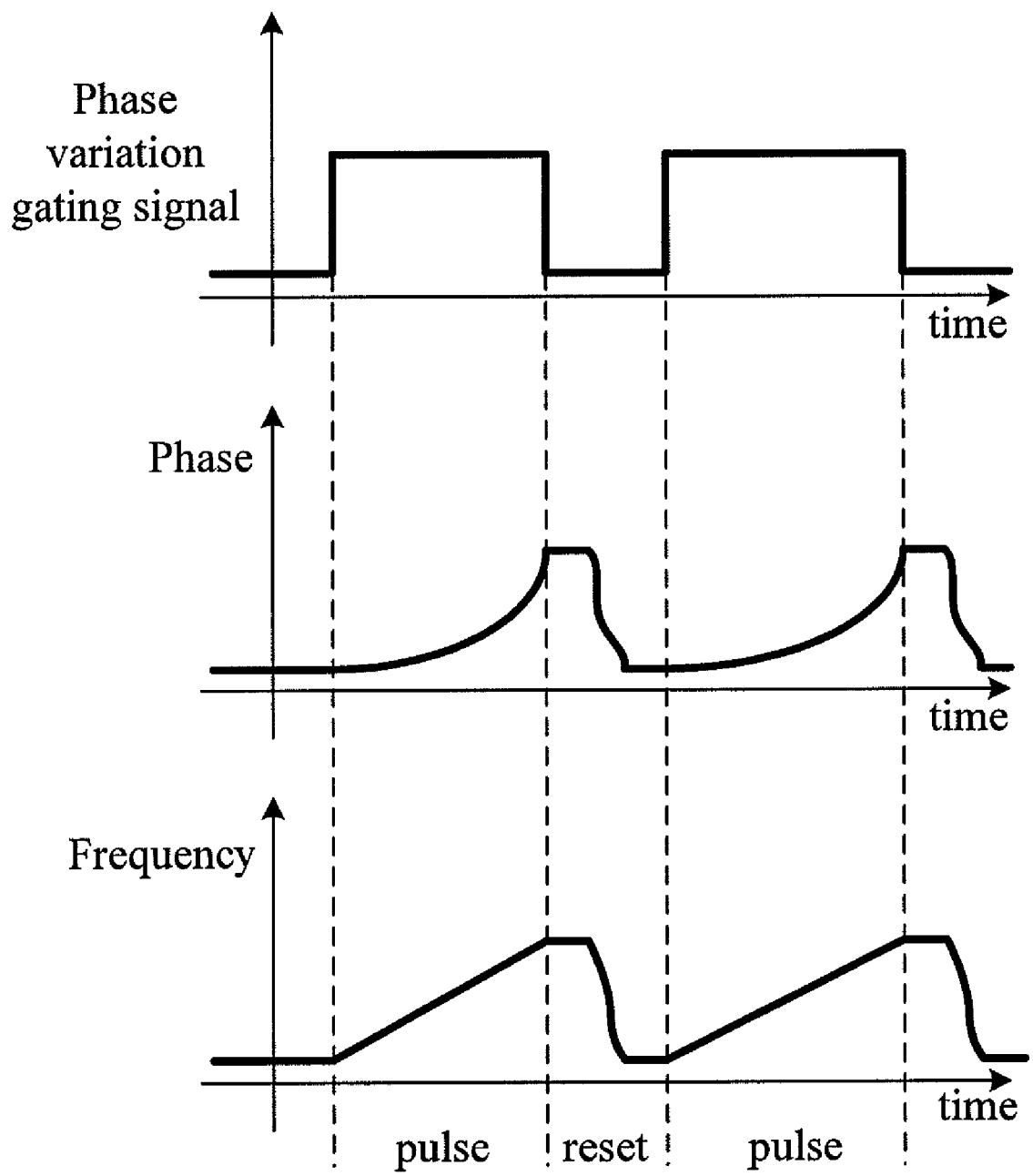
FIG. 29 is an example of a synchronously gated phase variation signal used to impose a linear frequency chirp along the optical pulse.

The pulse to pulse spectral agility of some embodiments of the present invention is particularly well adapted to remote sensing applications such as Differential Absorption LIDAR (DIAL) and range-resolved Tuneable Diode Laser Spectroscopy (TDLS). Both techniques are used to measure the concentration of gas or air-suspended particles, and require complex laser sources for illuminating the target, whose absorption or scattering is measured as a function of laser wavelength. DIAL requires a source with two emission wavelengths and measures the differential absorption loss at the two wavelengths due to the gas or particles. The differential measurement allows for higher sensitivity than standard LIDAR. TDLS instead uses a tuneable laser source and measures a spectrum of absorption or scattering by illuminating the target and sweeping the laser wavelength. In both cases, the maximum measurement sensitivity is obtained when the laser output power is high and for narrow laser linewidths. Embodiments of the present invention can provide high peak power laser sources with very narrow linewidths by choosing a suitable seed. Moreover, the laser output power or pulse energy can be significantly increased with minimum alteration of the spectrum over previously disclosed fibre based laser sources because the SBS threshold is increased and the SPM is controlled very well. Both DIAL and TDLS can be implemented using embodiments of the present invention. For example, in the case of TDLS, a linear frequency chirp along the optical pulse can be imposed and controlled from pulse to pulse, which corresponds to a quadratic increase of the optical phase along the pulse for the phase variation signal, followed by a phase reset between two pulses, as illustrated in FIG. 29. For DIAL, one could impose a phase variation along the pulse and control the intensity as well as the center frequency of the created spectral lines and seek for "holes" or distortions in the scattered pulses amplitude profile, said holes corresponding to light absorption by chemical species that are present in the illuminated target.

Numerous modifications could be made to the embodiments of the present invention without departing from the scope of the present invention as defined in the appended claims.

The invention claimed is:

1. A pulsed fiber laser oscillator, comprising:
   a light generating module generating optical pulses at a repetition rate, each optical pulse having a spectral profile, an amplitude profile and a pulse duration;
   a spectrum tailoring module for tailoring the spectral profile of the optical pulses, the spectrum tailoring module having at least one phase modulator for imposing a time-dependent phase variation on each of said pulses; and
   synchronizing means for activating the phase modulator in synchronization with the optical pulses.

2. The pulsed fiber laser oscillator according to claim 1, wherein the light generating module comprises:
   a seed assembly outputting the optical pulses; and
   a pulse generator cooperating with said seed assembly to control the amplitude profile, pulse duration and repetition rate of said optical pulses, the pulse generator providing a pulse synchronization signal to the synchronizing means.

3. The pulsed fiber laser oscillator according to claim 2, wherein the seed assembly comprises a pulsed seed source electrically driven by said pulse generator.

4. The pulsed fiber laser oscillator according to claim 2, wherein the seed assembly comprises:
   a continuous wave seed source generating a continuous light beam; and
   an amplitude modulator modulating said continuous light beam to provide said optical pulses, the amplitude modulator being driven by the pulse generator.

5. The pulsed fiber laser oscillator according to claim 2, wherein the seed assembly is tunable in wavelength.

6. The pulsed fiber laser oscillator according to claim 3, wherein the pulsed seed source comprises a semiconductor laser diode.

7. The pulsed fiber laser oscillator according to claim 1, wherein the phase modulator comprises an electro-optic component.

8. The pulsed fiber laser oscillator according to claim 7, wherein the electro-optic components comprises an electro-optic material selected from the group consisting of $LiNbO_3$, $LiTaO_3$, $KNbO_3$.

9. The pulsed fiber laser oscillator according to claim 1, wherein the phase modulator comprises an acousto-optic component.

10. The pulsed fiber laser oscillator according to claim 1, wherein the spectrum tailoring module comprises a plurality of said phase modulators arranged in a cascade.

11. The pulsed fiber laser oscillator according to claim 1, wherein the spectrum tailoring module comprises a recirculation assembly recirculating the optical pulses through said at least one phase modulator for a plurality of passes.

12. The pulsed fiber laser oscillator according to claim 11, wherein the recirculating assembly comprises:
  a circulator having a first port for receiving the optical pulses from the light generating module, a second port in communication with the phase modulator, and a third port for outputting said optical pulses; and
  a reflective element disposed in communication with the phase modulator on a side opposite said circulator.

13. The pulsed fiber laser oscillator according to claim 2, wherein the synchronizing means comprise a phase modulator driver providing a phase modulation drive signal to the phase modulator driving the activating of said phase modulator according to the time-dependent phase variation, the phase modulator driver receiving the pulse synchronization signal from the pulse generator.

14. The pulsed fiber laser oscillator according to claim 13, wherein the phase variation drive signal has a phase variation frequency and a phase variation peak amplitude, and wherein the phase modulator driver comprises:
  a source module generating a source signal defining said phase variation frequency;
  a high speed switching module selectively transmitting the source signal from the source module to the phase modulator, the high speed switching module being activated by the pulse synchronization signal; and
  a variable gain amplifying module disposed between the high speed switching module and the phase modulator for amplifying the source signal according to said phase variation peak amplitude.

15. The pulsed fiber laser oscillator according to claim 14, wherein the source module comprises at least one of a single frequency oscillator, a voltage-controlled oscillator and a noise source.

16. The pulsed fiber laser oscillator according to claim 14, wherein the source module comprises a plurality of source elements each generating a corresponding source signal component, the phase modulator driver further comprising a combiner combining said source signal components into the source signal.

17. The pulsed fiber laser oscillator according to claim 16, wherein each source element is selected from the group consisting of a single frequency oscillator, a voltage-controlled oscillator and a noise source.

18. The pulsed fiber laser oscillator according to claim 16, wherein the high speed switching module comprises a plurality of high speed switches each disposed between a corresponding one of the plurality of source elements and the combiner.

19. The pulsed fiber laser oscillator according to claim 18, wherein the variable gain amplifying module comprises a plurality of variable gain amplifier each disposed upstream the combiner and in series with one of the plurality of source elements and the corresponding high speed switch.

20. The pulsed fiber laser oscillator according to claim 16, wherein the high speed switching module comprises a high speed switch disposed downstream of the combiner.

21. The pulsed fiber laser oscillator according to claim 16, wherein the variable gain amplifying module comprises a variable gain amplifier disposed downstream the combiner.

22. The pulsed fiber laser according to claim 1, wherein the time-dependent phase variation has a phase variation frequency spectrum.

23. The pulsed fiber laser according to claim 22, wherein the phase variation frequency spectrum varies with time over the pulse duration.

24. The pulsed fiber laser oscillator according to claim 22, wherein the phase variation frequency spectrum has a cutoff frequency above a threshold for which the tailoring of the spectral profile of each of said optical pulses is substantially uniform over the pulse duration.

25. The pulsed fiber laser oscillator according to claim 24, wherein the threshold frequency is at least ten times the inverse of the pulse duration.

26. The pulsed fiber laser oscillator according to claim 24, wherein the threshold frequency is higher than 500 Mhz.

27. The pulsed fiber laser oscillator according to claim 1, wherein the time-dependent phase variation is changed from pulse to pulse.

28. The pulsed fiber laser oscillator according to claim 27, wherein the phase variation drive signal has a phase variation peak amplitude which is tailored in the time domain.

29. A method for providing high power optical pulses while avoiding the onset of non-linear effects, the method comprising:
  d) generating seed optical pulses at a repetition rate, each seed optical pulse having a spectral profile, an amplitude profile and a pulse duration;
  e) broadening the spectral profile of the seed optical pulses, said broadening comprising propagating the seed optical pulses through at least one phase modulator imposing a time-dependent phase variation on each of said pulses, thereby obtaining spectrally broadened optical pulses, said broadening comprising activating the phase modulator in synchronization with the seed optical pulses; and
  f) amplifying said broadened optical pulses, thereby obtaining said high power optical pulses.

30. The method according to claim 29, wherein the time-dependent phase variation imposed at e) has a phase variation frequency spectrum having a cutoff frequency above a threshold for which the tailoring of the spectral profile of each of said optical pulses is substantially uniform over the pulse duration.

* * * * *